(12) United States Patent
Ho et al.

(10) Patent No.: US 9,295,094 B2
(45) Date of Patent: Mar. 22, 2016

(54) SYSTEM AND METHOD FOR PEER-TO-PEER CONNECTION REESTABLISHMENT

(75) Inventors: Sai Yiu Duncan Ho, San Diego, CA (US); Gavin Bernard Horn, La Jolla, CA (US); Miguel Griot, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 510 days.

(21) Appl. No.: 13/466,058

(22) Filed: May 7, 2012

(65) Prior Publication Data

US 2013/0297810 A1 Nov. 7, 2013

(51) Int. Cl.
*G06F 15/16* (2006.01)
*H04W 76/02* (2009.01)

(52) U.S. Cl.
CPC .......... *H04W 76/028* (2013.01); *H04W 76/023* (2013.01)

(58) Field of Classification Search
CPC .... G06F 15/16; H04L 29/06; H04L 29/08072
USPC ........................................................ 709/228
See application file for complete search history.

(56) References Cited

U.S. PATENT DOCUMENTS

| | | | |
|---|---|---|---|
| 7,155,518 B2* | 12/2006 | Forslow ........................ | 709/227 |
| 7,570,972 B2 | 8/2009 | Pirzada et al. | |
| 7,778,189 B2 | 8/2010 | Valli et al. | |
| 7,860,923 B2 | 12/2010 | Singer et al. | |
| 2002/0040399 A1* | 4/2002 | Nagashima ............. | H04L 29/06 |
| | | | 709/227 |
| 2003/0191841 A1* | 10/2003 | DeFerranti .............. | H04L 12/14 |
| | | | 709/226 |
| 2007/0153747 A1 | 7/2007 | Pan et al. | |
| 2008/0002686 A1* | 1/2008 | Valli et al. ...................... | 370/389 |
| 2009/0144424 A1* | 6/2009 | Takeda ................ | H04L 12/5693 |
| | | | 709/226 |
| 2009/0221275 A1* | 9/2009 | Trip .............................. | 455/418 |
| 2010/0124196 A1* | 5/2010 | Bonar et al. .................. | 370/329 |
| 2011/0082940 A1 | 4/2011 | Montemurro et al. | |
| 2012/0258726 A1* | 10/2012 | Bansal .............. | H04M 1/72563 |
| | | | 455/456.1 |
| 2013/0067065 A1* | 3/2013 | Navasivasakthivelsamy et al. ............................ | 709/224 |

(Continued)

FOREIGN PATENT DOCUMENTS

WO 03036875 A2 5/2003

OTHER PUBLICATIONS

Doppler, et al., "Device-to-Device Communication as an Underlay to LTE-Advanced Networks", Communications Magazine, IEEE Dec. 2009, vol. 47, Issue 12, pp. 42-49.

(Continued)

*Primary Examiner* — Razu A Miah
(74) *Attorney, Agent, or Firm* — Novak Druce Connolly Bove + Quigg LLP

(57) ABSTRACT

Techniques are provided for efficiently reestablishing connection between peer-to-peer devices. For example, there is provided a method for peer-to-peer (P2P) connection reestablishment by a mobile device. The method may involve caching at least one of a Radio Resource Control (RRC) context and a session management (SM) context for a previous P2P session with a peer mobile device. The method may further involve establishing a connection with the peer mobile device based at least in part on at least one connection context identifier (CC ID) associated with the previous P2P session. The method may further involve reestablishing a previous session state based on the at least one of the RRC context and the SM context.

52 Claims, 26 Drawing Sheets

(56) References Cited

U.S. PATENT DOCUMENTS

2013/0103844 A1* 4/2013 Bulut .................. H04L 67/145
709/228
2013/0142056 A1* 6/2013 Abplanalp .............. H04W 8/18
370/252

OTHER PUBLICATIONS

Doppler K et al., "Device-to-Device Communications; Functional Prospects for LTE-Advanced Networks", Communications Workshops, 2009. ICC Workshops 2009. IEEE International Conference on, IEEE, Piscataway, NJ, USA, Jun. 14, 2009, pp. 1-6, XP031515460, ISBN: 978-1-4244-3437-4 * abstract, chapters II, III *.

Ericsson., et al., "Radio Link Failure and Context Recovery", 3GPP Draft; R2-071716 Radio Link Failure and Context Recovery, 3rd Generation Partnership Project (3GPP), Mobile Competence Centre ; 650, Route Des Lucioles ; F-06921 Sophia-Antipolis Cedex ; France, vol. RAN WG2, No. Kobe, Japan; May 7, 2007-May 11, 2007, May 4, 2007, XP050603015, [retrieved on May 4, 2007] section 2.

International Search Report and Written Opinion—PCT/US2013/040009, International Search Authority—European Patent Office, Oct. 2, 2013.

IPWireless Inc., "On Retaining RRC Context", 3GPP TSG RAN WG2 Meeting #77b Jeju, Korea, Mar. 26-30, 2012, Discussion, R2-121550, Mar. 19, 2012, XP050606026.

* cited by examiner

SYSTEM AND METHOD FOR PEER-TO-PEER CONNECTION REESTABLISHMENT

BACKGROUND

1. Field

The present application relates generally to wireless communications, and more specifically to techniques for efficiently reestablishing connection between peer-to-peer devices.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). The LTE physical layer (PHY) is a highly efficient means of conveying both data and control information between an evolved NodeB (eNB) and mobile entities, such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

Examples of older wireless communication systems widely deployed to provide various types of communication content such as voice and data include Code Division Multiple Access (CDMA) systems, including CDMA2000, Wideband CDMA, Global System for Mobile communications (GSM), and Universal Mobile Telecommunication System (UMTS). These wireless communication systems and LTE systems generally use different radio access technologies (RATs) and communication protocols, operate at different frequency bands, provide different quality of service (QoS), and offer different types of services and applications to the system users.

In a direct wireless connection, a first mobile entity transmits a wireless signal directly to a second mobile entity, which receives and processes the wireless signal. Examples of direct wireless connections include connections from a mobile entity to eNB(s) in LTE or other wireless communications protocols, or peer-to-peer (P2P) connections between mobile entities as used in non-cellular protocols such as WiFi Direct or Bluetooth. Cellular wireless communications systems do not typically include direct connections between mobile entities. Rather, the mobile entities typically communicate indirectly with one another through one or more NodeBs and associated network infrastructure. In this context, in response to suspension of a previous P2P session between mobile entities, there is a need for efficiently reestablishing the P2P connection and the previous session state.

SUMMARY

Methods, apparatus, and systems for efficiently reestablishing connection between peer-to-peer devices are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In accordance with one or more aspects of the embodiments described herein, there is provided a method for peer-to-peer (P2P) connection reestablishment by a mobile device. The method may involve caching at least one of a Radio Resource Control (RRC) context and a session management (SM) context for a previous P2P session with a peer mobile device. The method may further involve establishing a connection with the peer mobile device based at least in part on at least one connection context identifier (CC ID) associated with the previous P2P session. The method may further involve reestablishing a previous session state based on the at least one of the RRC context and the SM context. In related aspects, an electronic device (e.g., a mobile station or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DESCRIPTION

Figure 1:
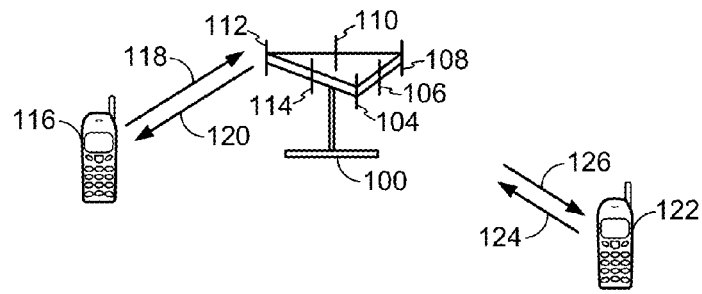
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein are applicable to other technologies, such as the technologies and standards mentioned above.

Single-Carrier Frequency Division Multiple Access (SC-FDMA), which utilizes single carrier modulation and frequency domain equalization, has similar performance and essentially the same overall complexity as those of OFDMA systems. An SC-FDMA signal has lower peak-to-average power ratio (PAPR) because of its inherent single carrier structure. SC-FDMA has drawn great attention, especially in the uplink (UL) communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional one including 112 and 114. In FIG. 1, two antennas are shown for each antenna group, however, more or fewer antennas may be utilized for each antenna group. A mobile entity 116 is in communication with the antennas 112 and 114, where the antennas 112 and 114 transmit information to the mobile entity 116 over a forward link 120 and receive information from the mobile entity 116 over a reverse link 118. A mobile entity 122 is in communication with the antennas 104 and 106, where the antennas 104 and 106 transmit information to the mobile entity 122 over a forward link 126 and receive information from the mobile entity 122 over a reverse link 124. In a Frequency Division Duplex (FDD) system, the communication links 118, 120, 124 and 126 may use different frequencies for communication. For example, the forward link 120 may use a different frequency than that used by the reverse link 118.

Each group of antennas and/or the area in which they are designed to communicate is often referred to as a sector of the access point. In certain embodiments, antenna groups each are designed to communicate with mobile entities in a sector, of the areas covered by the access point 100.

In communication over the forward links 120 and 126, the transmitting antennas of the access point 100 may utilize beamforming in order to improve the signal-to-noise ratio of forward links for the different mobile entities 116 and 122. Also, an access point using beamforming to transmit to mobile entities scattered randomly through its coverage causes less interference to mobile entities in neighboring cells than an access point transmitting through a single antenna to all its mobile entities.

An access point may be a fixed station used for communicating with the terminals and may also be referred to as an access point, a NodeB, an eNB, or some other terminology. A mobile entity may also be referred to as an access terminal (AT), a user equipment (UE), a mobile station, a wireless communication device, terminal, or the like.

Figure 2:
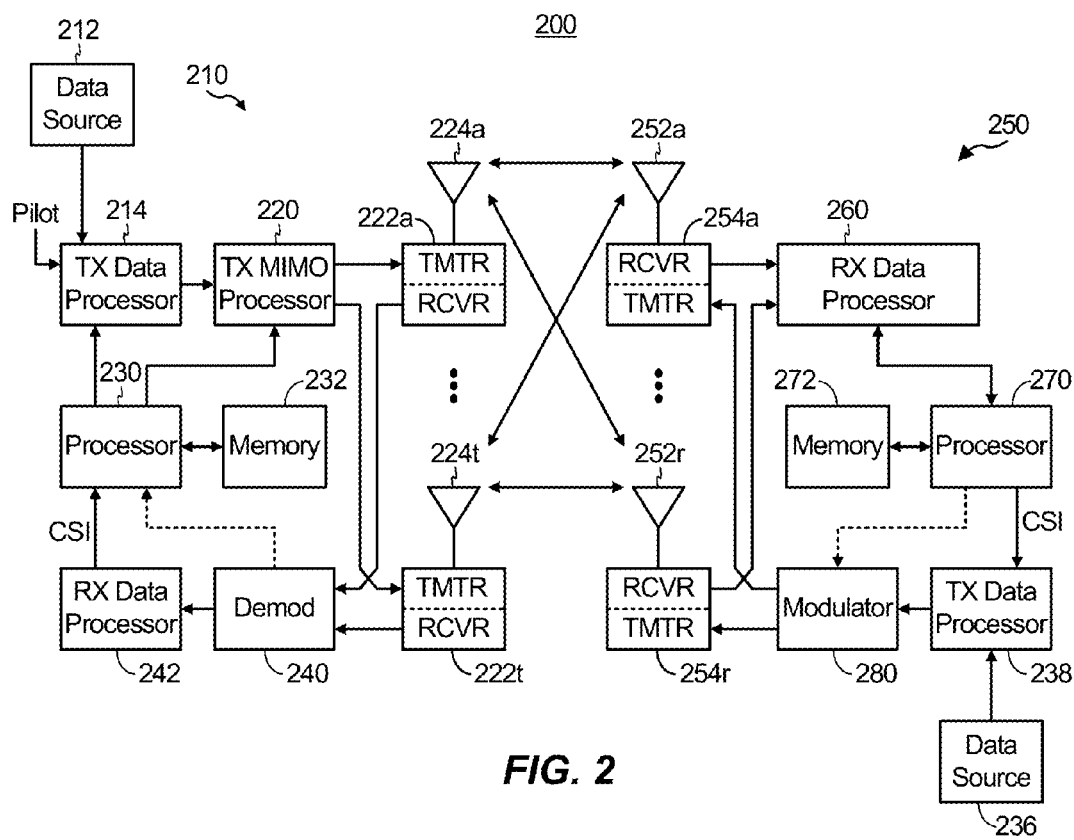
FIG. 2 illustrates a block diagram of a communication system.

FIG. 2 is a block diagram of an embodiment of a transmitter system 210 (also known as an access point) and a receiver system 250 (also known as a mobile entity) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
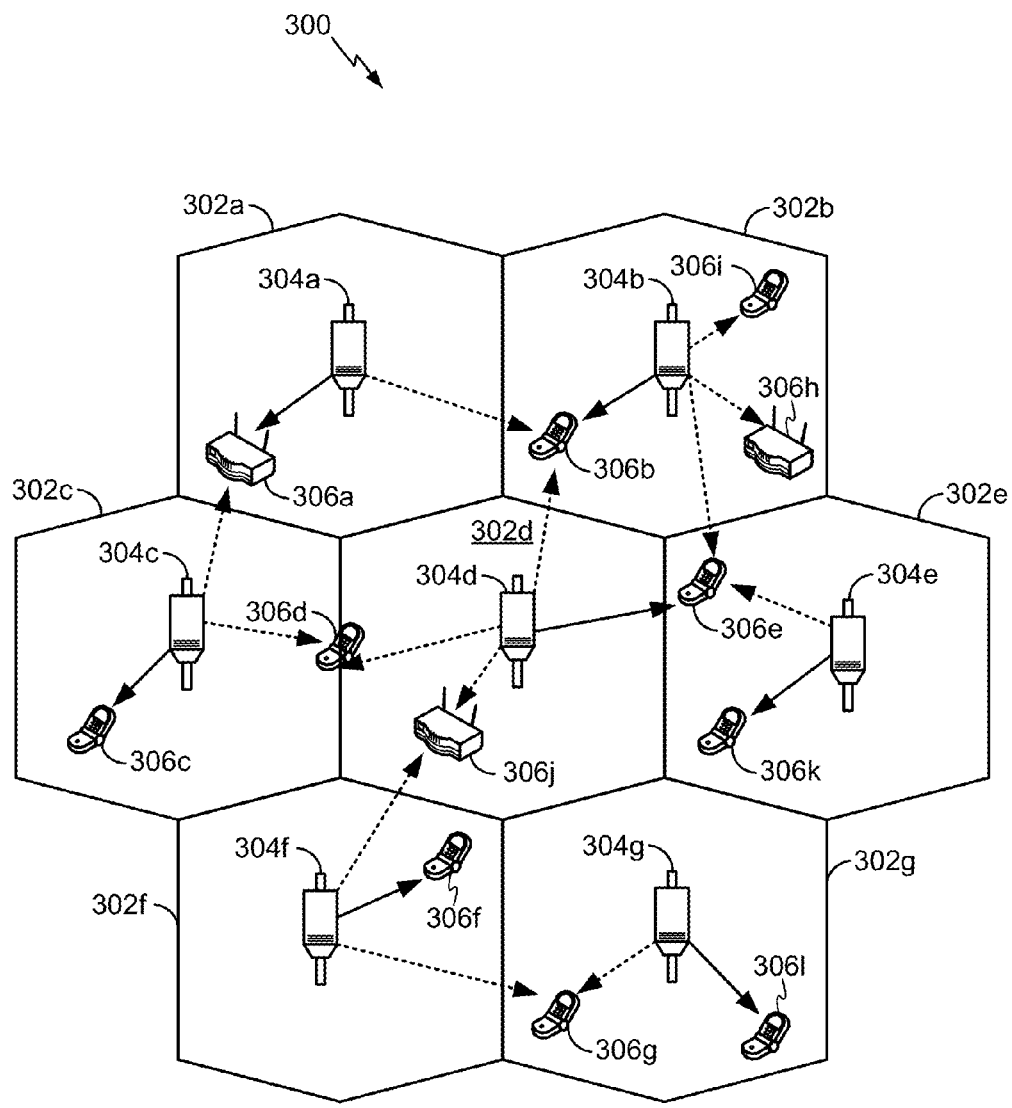
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 3, mobile entities 306 (e.g., mobile entities 306a-306l) may be dispersed at various locations throughout the system over time. Each mobile entity 306 may communicate with one or more access nodes 304 on a forward link ("FL") and/or a reverse link ("RL") at a given moment, depending upon whether the mobile entity 306 is active and whether it is in soft handoff (if applicable), for example. The wireless communication system 300 may provide service over a large geographic region. For example, macro cells 302a-302g may cover a few blocks in an urban or suburban neighborhood or a few square miles in a rural environment.

In accordance with aspects of the subject of this disclosure, there is provided a wireless network (e.g., a 3GPP network) having a feature for using a spectrum provider (e.g., an LTE network provider) for peer-to-peer (P2P) communication. In this context, P2P communication is a direct communication between two mobile entities without the need for transportation of communicated data through an access node or a core network node.

Figure 4:
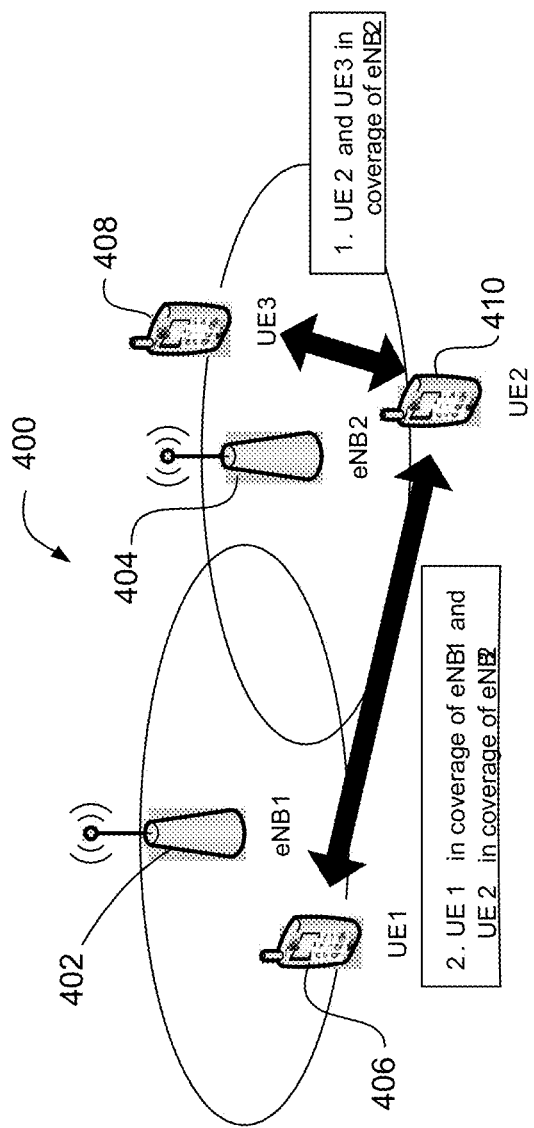
FIG. 4 illustrates mobile entities in communication via a radio access network and via direct wireless connections.

FIG. 4 shows an embodiment of a communication system 400 comprising mobile entities 406, 408, 410 in communication via eNBs 402, 404 of a radio access network (RAN) and via direct wireless connections. The depicted example illustrates peer discovery for (1) UEs 408, 410 camped at a cell on the same eNB 404 and (2) UEs 406, 410 camped at cells for respective different eNBs 402, 404. Peer discovery is a procedure whereby UEs detect the availability of other services advertised at UEs within radio frequency (RF) proximity, and may generally involve peer advertisement and peer detection.

Peer mobile entities may perform detection, wherein authorized mobile entities may receive information to be able to perform detection (e.g., security keys or the like). Also, the peer mobile entities may perform advertising, wherein authorized mobile entities may receive information to be able to advertise a discovery identifier (e.g., security keys). Each mobile entity refrains from advertising a discovery identifier for which it has not been authorized. Further, the peer mobile entities may perform direct communication, wherein each mobile entity refrains from establishing direct communication with a peer advertising a discovery identifier for which it has not been authorized.

It is noted that a network or spectrum provider may authorize a mobile entity to use the network's spectrum to perform the above described P2P communication procedures. It is also noted that the mobile entity may not be provisioned with P2P parameters and may be expected to request authorization for each procedure or set of procedures. For example, the mobile entity may request authorization for detection, detection and advertising, and/or direct communication. Authorization based on the techniques described herein could be: (a) per tracking area for tracking area update (TAU) procedures; (b) while attached for attach procedures; and/or (c) based on a lifetime of reserved bearers for evolved packet system (EPS) session management (ESM) procedures.

Figure 5:
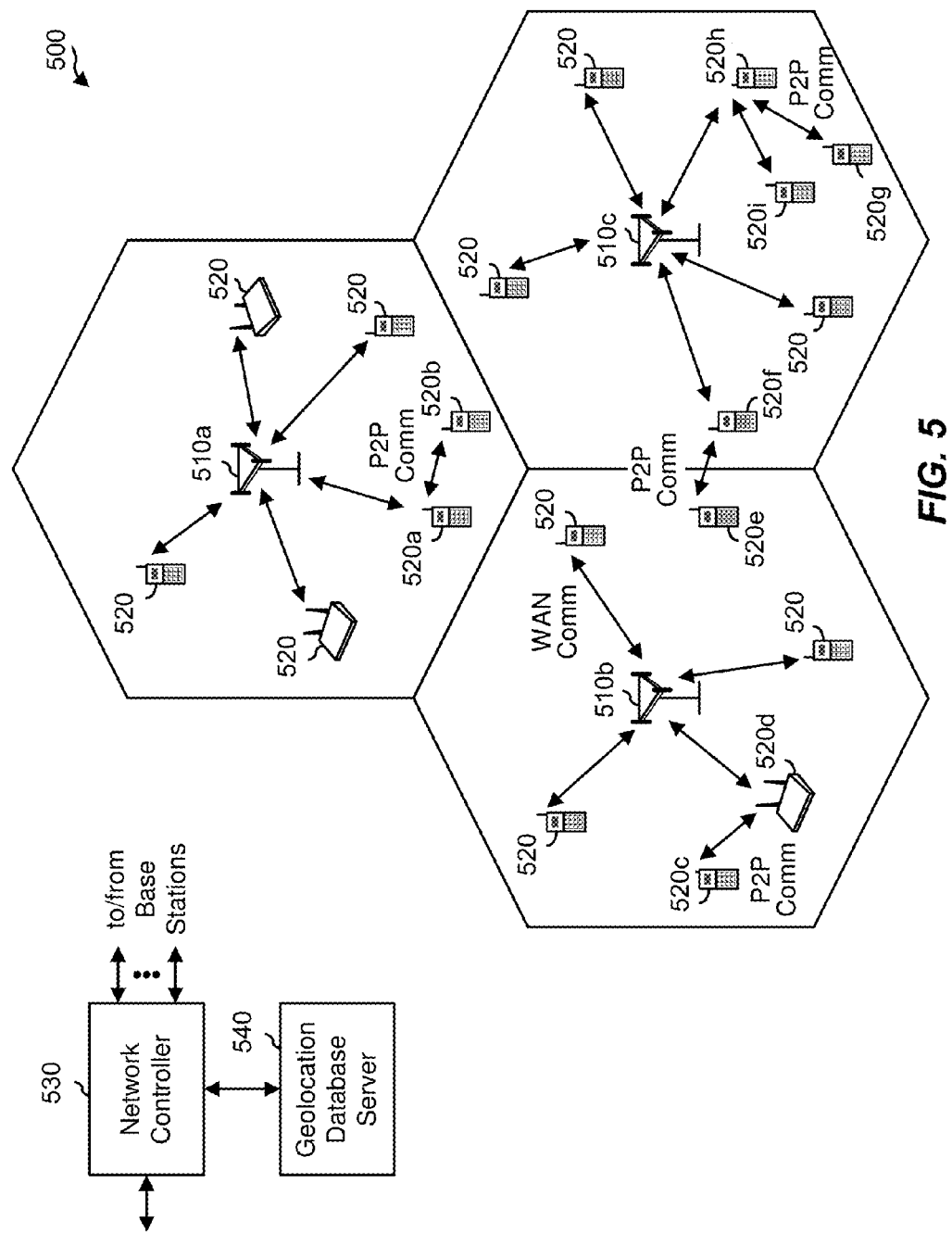
FIG. 5 shows a wireless communication network that supports both WAN communication and P2P communication.

FIG. 5 shows a wide area network (WAN) 500, which may be a LTE network or some other type of WAN. WAN 500 may include a number of base stations and other network entities. For simplicity, only three base stations 510a, 510b and 510c and one network controller 530 are shown in FIG. 5. A base station may be an entity that communicates with the UEs and may also be referred to as a NodeB, an eNB, an access point, etc. Each base station may provide communication coverage for a particular geographic area and may support communication for the UEs located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group). In the example shown in FIG. 5, WAN 500 includes macro base stations 510a, 510b and 510c for macro cells. WAN 500 may also include pico base stations for pico cells and/or femto/home base stations for femto cells (not shown in FIG. 5).

Network controller 530 may couple to a set of base stations and may provide coordination and control for these base stations. Network controller 530 may communicate with the base stations via a backhaul. The base stations may also communicate with one another via the backhaul. A geolocation database server 540 may couple to network controller 530 and/or other network entities. Server 540 may support use of an unlicensed spectrum, as described below.

In the description herein, a WAN communication may refer to a communication between a UE and a base station, e.g., for a call with a remote station such as another UE. An access link may refer to a communication link between a UE and a base station. A P2P communication may refer to a direct communication between two or more UEs, without going through a base station. Also, a P2P communication may refer to a third-party entity assisted communication between two or more UEs, wherein a communication link between the two or more UEs may include the third-party such that the two or more UEs communicate via the third-party. The third party entity, for example, may be a base station, another UE, etc. A P2P link may refer to a communication link between two or more UEs engaged in P2P communication. A P2P group may refer to a group of two or more UEs engaged in P2P communication. In one design, one UE in a P2P group may be designated as a P2P server, and each remaining UE in the P2P group may be designated as a P2P client. The P2P server may perform certain management functions such as exchanging signaling with a WAN, coordinating data transmission between the P2P server and the P2P client(s), etc.

In the example shown in FIG. 5, UEs 520a and 520b are under the coverage of base station 510a and are engaged in P2P communication. UEs 520c and 520d are under the coverage of base station 510b and are engaged in P2P communication. UEs 520e and 520f are under the coverage of different base stations 510b and 510c and are engaged in P2P communication. UEs 520g, 520h and 520i are under the coverage of the same base station 510c and are engaged in P2P communication. The other UEs 120 in FIG. 5 are engaged in WAN communication.

WAN 500 may operate on one or more frequency channels that are licensed to a network operator. WAN 500 may support both WAN communication and P2P communication on the licensed frequency channel(s). In this case, some resources on the licensed frequency channel(s) may be reserved for P2P communication and the remaining resources may be used for WAN communication. The term "spectrum" generally refers to a range of frequencies such as a frequency band, or a frequency channel, etc.

In accordance with one or more aspects of the embodiments described herein, there are provided techniques for efficient and quick connection reestablishment for P2P service between mobile devices (e.g., UEs). For example, in an embodiment of a P2P direct connection design, the UE may typically perform the full connection establishment procedures, which involves authentication procedures between the peers. It is expected that when the session goes inactive for some time, the connection will be torn down. So the next time the peer devices need to reconnect, the entire connection establishment (including authentication) may be performed again. The techniques described herein involve the peer devices caching state information, such that when the peer devices need to re-connect, the connection can be established with fewer message exchanges and less processing in general.

Figure 6:
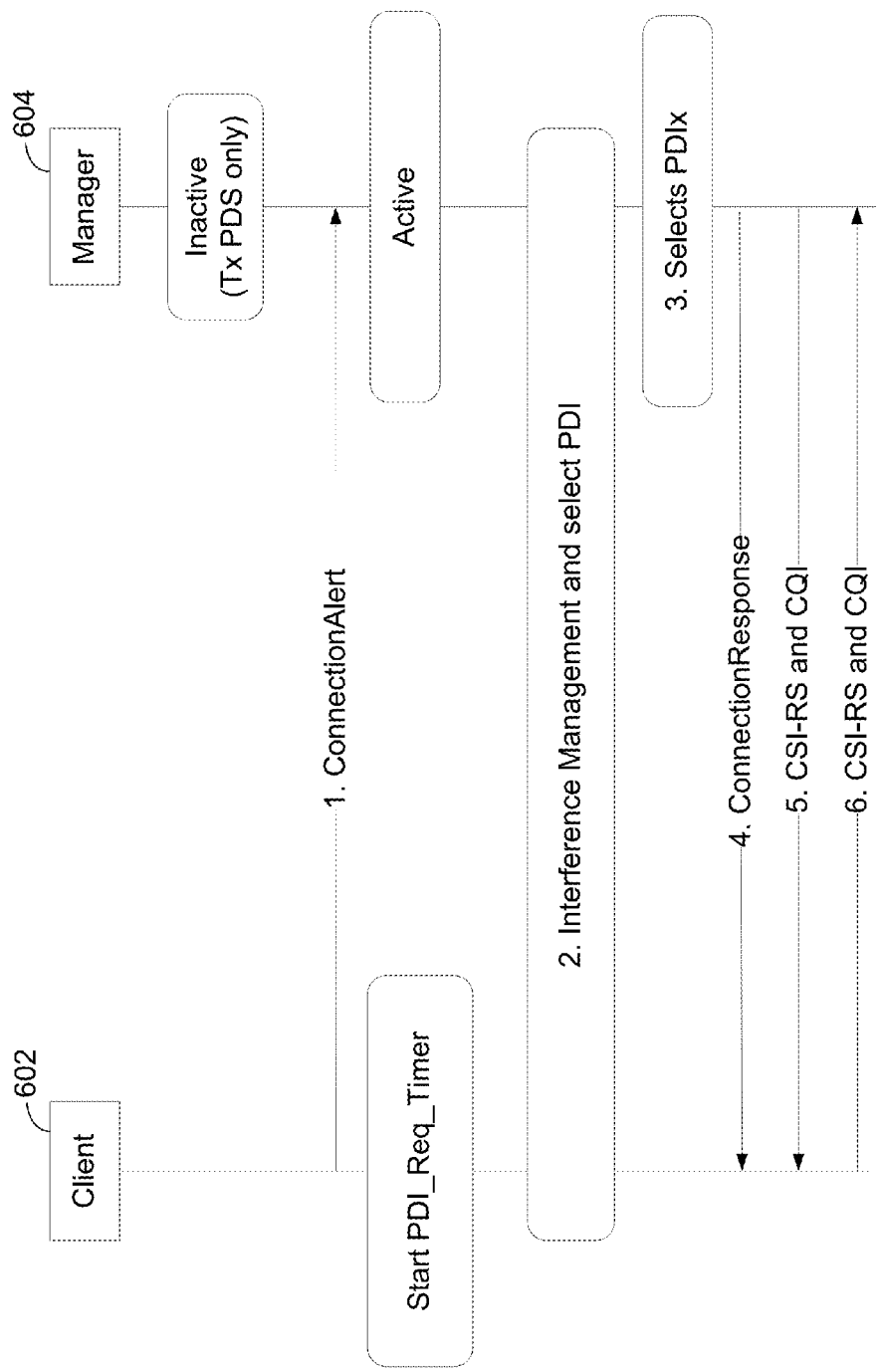
FIG. 6 is a flow diagram for an example approach for establishing a direct connection between peer mobile entities.

Connection Establishment: With reference to FIG. 6, there is provided a flow diagram showing an example of how a connection may be established between two mobile devices—namely, a client device 602 and a manager device 604. At step 1, the client device 602 may send a Connection-Alert to the manager device 604 one or more identifiers, such as, for example, Connection-ID-Client, Connection-ID-Manager, and/or Preferred-CSI-RS-Scrambling-Codes-List, such as, for example, a Passive Distributed Index (PDI) list or the like. In addition, the client device 602 may start a timer, such as, for example, a PDI-Req-Timer or the like. In related aspects, with respect to P2P services, such as device-to-device communication, the service discovery identifier (SD ID) is the identifier used in the discovery procedure for advertising and detecting a P2P service. It is noted that the Connection-ID may be determined by a SD ID conveyed by a Proximity Detection Signal (PDS) or the like.

At step 2, the client device 602 and the manager device 604 may perform interference management. At step 3, the manager device 604 may select a PDI (e.g., PDIx). At step 4, the manager device 604 may send a Connection-Response, which may include Connection-ID2, Connection-ID1, Preferred-CSI-RS-scrambling-code, P2P-C-RNTI (Radio Network Temporary Identifier), and/or TX-Interlace-of-Manager (e.g., TX-Interlace-of-Client offset by 4). The client device 602 may start from step 1 again if it does not want the PDI selected by the manager device 604.

At step 5, the manager device 604 may start transmitting pilots (e.g., a Channel State Information Reference Signal (CSI-RS)) and Channel Quality Indicator (CQI) measurements on its TX interlaces, for example, according to a default CQI configuration upon sending the Connection-Response. At step 6, the client device 602 may start transmitting pilots (e.g., CSI-RS) and CQI measurements on its TX interlaces, according to a default CQI configuration upon reception of the Connection-Response.

Figure 7:
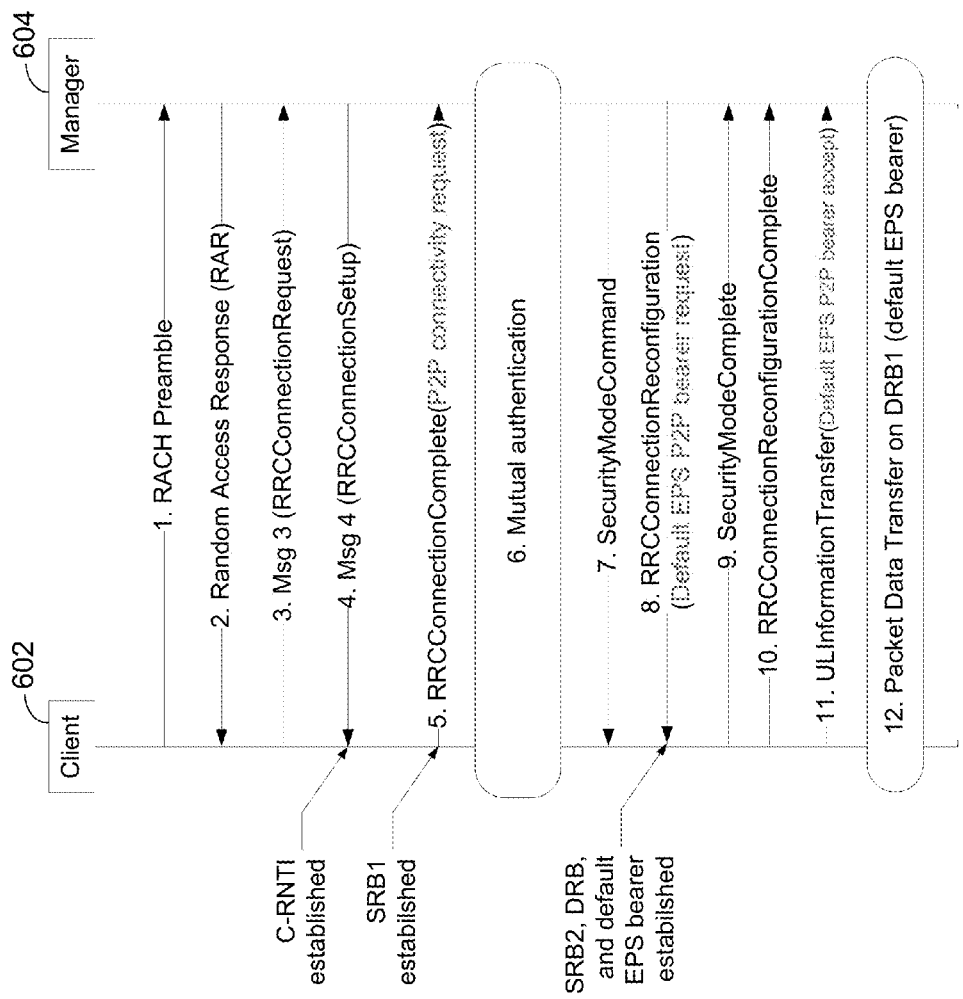
FIG. 7 shows an approach to P2P direct connection establishment.
Figure 8:
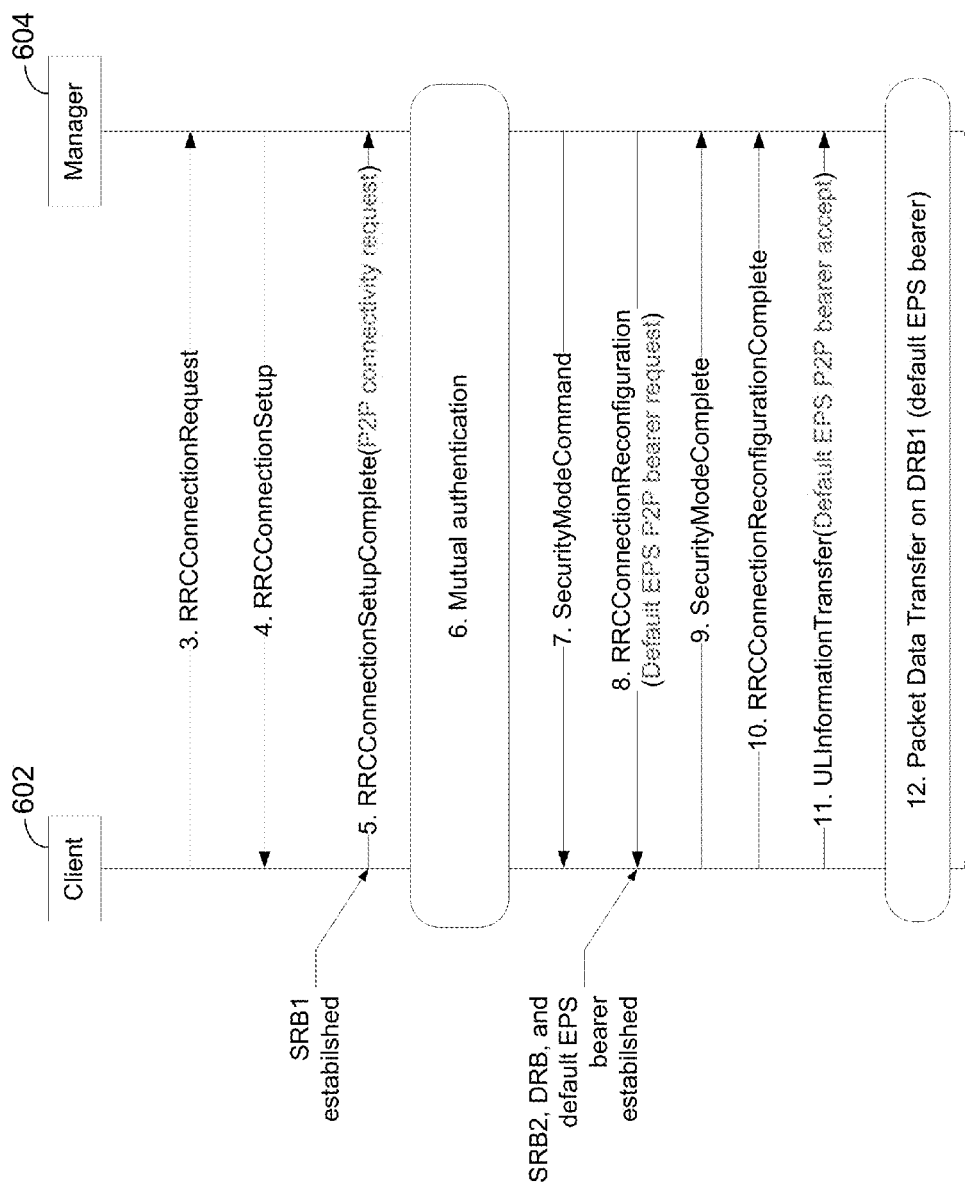
FIG. 8 illustrates an embodiment of a technique for expedited P2P connection reestablishment.

Direct Connection Establishment Without WAN Assistance: With reference to FIG. 7, there is shown an approach to P2P direct connection establishment, which involves establishing a Signaling Radio Bearer (SRB) and a Data Radio Bearer (DRB). With reference to FIG. 8, there is illustrated an embodiment of a streamlined approach for P2P direct connection establishment. In contrast to the approach of FIG. 7, the streamlined approach of FIG. 8 does not need steps 1 and 2.

With continued reference to the embodiment of FIG. 8, at step 3, the client device 602 may send a connection request message (e.g., RRC-Connection-Request), which may include an S-Temporary Mobile Subscriber Identity (S-TMSI), establishment-cause, etc. The client device 602 may include a full UE ID that identifies the client device 602 uniquely to peers devices, such as the manager device 604. At step 4, the manager device 604 may send a connection setup message (e.g., RRC-Connection-Setup) to the client device 602. At step 5, the client device 602 may send a connection setup complete message (e.g., RRC-Connection-Setup-Complete), which may include a Session Management (SM) message, such as, for, example, a P2P connectivity request. At step 6, mutual authentication may be performed by the peer devices. The peer devices may also decide whether the client device 602 or the manager device 604 will send a Security-Mode-Command message or the like. The remaining steps generally involve setting up security between the peer devices, setting up a radio bearer between the peer devices, and setting up a default EPS P2P bearer.

For example, assuming that the manger device is designated to send the Security-Mode-Command, the manager device 604 may send the Security-Mode-Command to the client device 602 at step 7. At step 8, the manager device 604 may send a connection reconfiguration message (e.g., RRC-Connection-Reconfiguration), which may include another SM message, such as, for example, a default EPS P2P bearer request message. At step 9, the manager device 604 may send a Security-Mode-Complete or the like to the client device 602. At step 10, the client device 602 may send a connection reconfiguration complete message (e.g., RRC-Connection-Reconfiguration-Complete) to the manager device 604. At step 11, the client device 602 may send an UL-Information-Transfer message, which may include another SM message, such as, for example, a default EPS P2P bearer accept message. At step 12, the client device 602 and manager device 604 may exchange user data, involving packet data transfer on the default EPS bearer.

In related aspects, for quick reconnection, a unique ID may be used to identify the session that was suspended. For example, at least one connection context identifier (CC ID) may be implemented, and may be associated with: Connection-ID-Client; Connection-ID-Manager; and/or a P2P cell radio network temporary identifier (C-RNTI). In further related aspects, one approach to direct connection establishment assumes that a client device 602 will remain the client device 602, and that a manager device 604 will remain a manger device. In another embodiment, however, peer devices may switch their roles during reconnect, such that the former client device 602 becomes the current manager device 604 and the former manager device 604 becomes the current client device 602.

Figure 9:
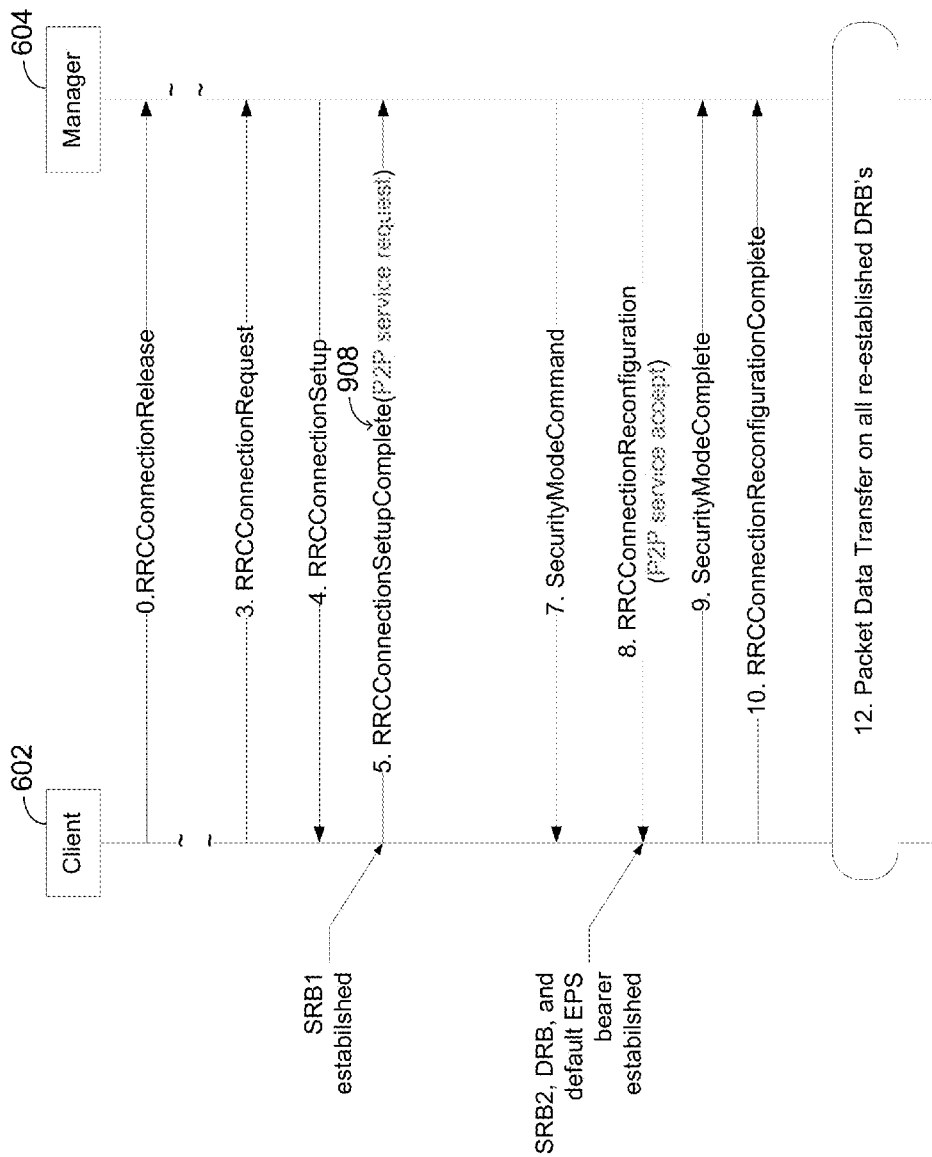
FIG. 9 illustrates another embodiment of a technique for expedited P2P connection reestablishment.

Quick Connection Reestablishment (SM Context Cached After Release): With reference to FIG. 9, there is shown an embodiment of another technique for expedited P2P connection reestablishment. For example, at step 0, a given mobile device (e.g., the client device 602) may send a connect release message (e.g., RRC-Connection-Release) to a peer mobile device (e.g., the manager device 604). As such, the client device 602 and the manager device 604 both still have the RRC context (e.g., the security context) and the SM context. For example, the RRC context may include information relating to Media Access Control (MAC) configuration, Packet Data Convergence Protocol (PDCP) configuration, and/or Radio Link Control (RLC) configuration. As a result, in contrast to the embodiment of FIG. 8, steps 1, 2, 6, and 11 are no longer needed and may be skipped. Also in contrast to the embodiment of FIG. 8, the connection setup message at step 5 may include a P2P service request message (in lieu of the P2P connectivity request message), while the connection reconfiguration message at step 8 may include a P2P service accept message (in lieu of the default EPS P2P bearer request message). Here, in the embodiment of FIG. 9, the "connection context" includes the SM context.

Figure 10:
FIG. 10 illustrates yet another embodiment of a technique for expedited P2P connection reestablishment.

Quick Connection Reestablishment (All Connection Context Cached After Release): With reference to FIG. 10, there is shown an embodiment of another technique for expedited P2P connection reestablishment. For example, at step 1, a given mobile device (e.g., the client device 602) may send a suspend message (e.g., RRC-Suspend) to its peer mobile device (e.g., the manager device 604). Here, both P2P mobile devices (i.e., the client device 602 and the manager device 604) still have the RRC context (e.g., security context) and the SM context. In this case, the client device 602 and manager device 604 may cache, or transparently store, the RRC and SM context so that future requests for the data may be serviced. The RRC context may include information relating to MAC configuration, PDCP configuration, and/or RLC configuration. At step 2, the client device 602 may be ready to reconnect, and may send a connection reestablishment request message (e.g., RRC-Connection-Reestablishment-Request) to the manager device 604. The client device 602 may include one or more CC IDs in the message connection reestablishment request message. In one embodiment, there may be a single CC ID for both the RRC context and the SM context. In another embodiment, there may be a first CC ID for the RRC context and a second CC ID for the SM context, such that one CC ID of the two may be brought up independently of the other (e.g., in eNB to UE, the RRC context may be re-created each time but the SM context may be cached in the core network). In response to receiving the connection reestablishment request message from the client device 602, the manager device 604 may restore the previous SM configuration.

With continued reference to FIG. 10, at step 3, the manager device 604 may send a connection reestablishment response message (e.g., RRC-Connection-Reestablishment-Response) to the client device 602. At step 4, the client device 602 may send a connection reestablishment complete message (e.g., RRC-Connection-Reestablishment-Complete) to the manager device 604. At step 5, the peer devices may resume packet data transfer on the restored DRBs. Here, in the embodiment of FIG. 10, the "connection context" may include the RRC context and/or the SM context. The "connection context" may further include the MAC configuration, the PDCP configuration, and/or the RLC configuration. In related aspects, one or more of the MAC configuration, the PDCP configuration, and the RLC configuration may need to be reset.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 11A:
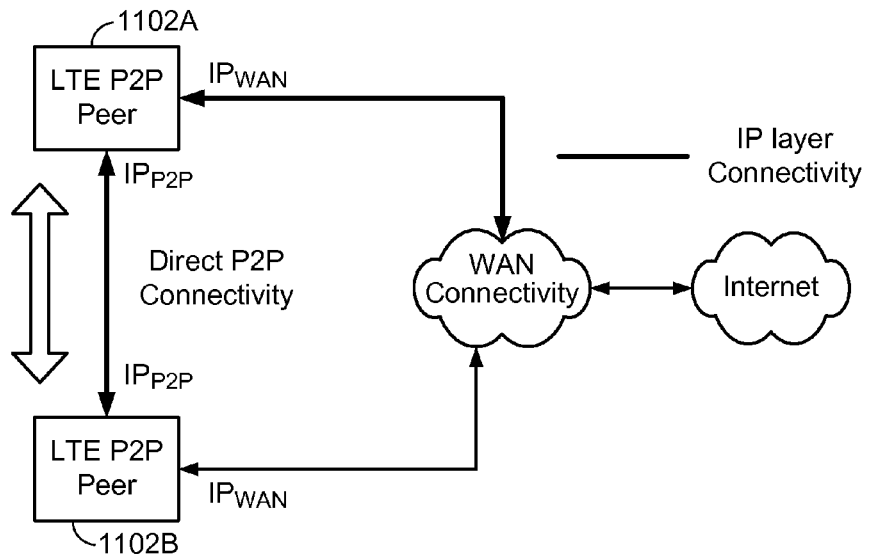
FIGS. 11A-B illustrate embodiments for choosing paths for P2P session continuity.
Figure 11B:
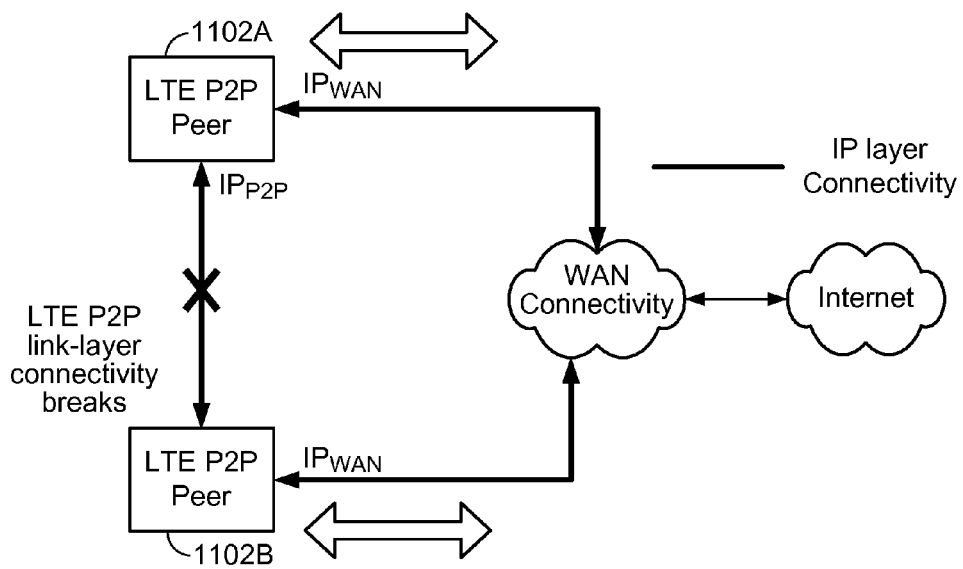

FIGS. 11A-B illustrate embodiments for choosing paths for P2P session continuity. Session continuity provides Seamless switching of the connectivity between peer-to-peer connection and WAN connection, as observed by an application. As FIGS. 11A-B show two possible paths for peer-to-peer communication: 1) direct communication: when the two peers are within RF proximity of each other and direct communication is possible, they both use the direct link (P2P IP); and 2) communication over the WAN: when the two peers are not within RF proximity of each other or direct communication fails, they both use the WAN connectivity (WAN IP). Other considerations can be made in choosing between the two paths, such as QoS, etc.

Two cases are considered in FIGS. 11A-B. In FIG. 11A, a pair of UEs (such as P2P Peers 1102A, 1102B) communicating over the WAN move into range and establish a direct connection. In FIG. 11B, a pair of UEs communicating directly with each other move out of range and hand over to the WAN. In an embodiment, a few considerations are taken into account for session continuity. Session continuity may be applied when both UEs have connectivity to the Internet, either via the LTE WAN, WLAN, etc. In addition, the Core Network may not need to know the current state of the direct link between the UEs so that the decision of which path to use may be left for the UEs, provided both UEs are authorized for peer-to-peer services. The routing tables in a P-GW are not affected by the chosen path between the UEs.

Session continuity may be performed with only IPv6 addresses. There may be no need for a Home Agent (HA) to be involved in session continuity procedures under such circumstances. The Shim6 protocol may be used for the following reasons: 1) Shim6 provides session continuity between the direct communication and the WAN connectivity; and 2) there is no network impact, as the procedures are performed between UEs.

Figure 12:
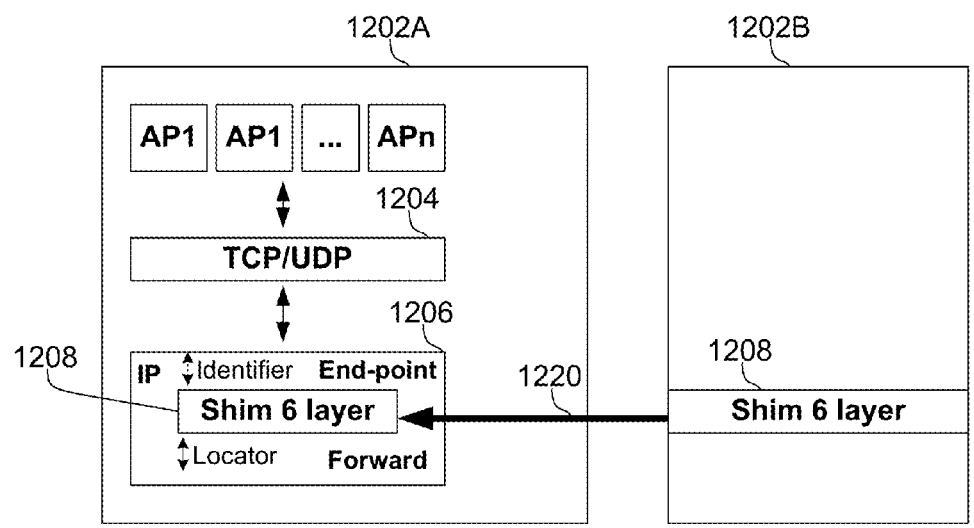
FIG. 12 illustrates a block diagram of a layer structure for a Shim6 protocol.

FIG. 12 illustrates a block diagram of a layer structure for a Shim6 protocol. The block diagram in FIG. 12 includes first and second apparatuses 1202A, 1202B (such as a UE configured with a Shim6 layer 1208) in communication using the Shim6 protocol 1220. Shim6 may be used for the following reasons: 1) Shim6 provides session continuity between the direct communication and the WAN connectivity; and 2) there is no network impact, as the procedures are performed between UEs. In an embodiment, session continuity may be performed with Shim6 The home address is an IP address provided by the WAN (or WLAN, etc). The Shim6 layer 1208 may act as a sublayer within the IP layer 1206 as shown in FIG. 12. Above the Shim6 protocol element, the protocol stack uses constant endpoint identities denoted ULID (Upper layer identifier) to refer to both itself and to the remote protocol stack. The ULID separates the transport layer identity from the actual locator although the ULID is used as an initial point of contact. The ULIDs in this case are the home IP addresses for internet connectivity, and its usage as referral works as long as the peer node is reachable via the address specified by the ULID (as long as the peer UE has WAN connectivity). The Shim6 layer 1208 provides a set of associations between ULID pairs and locator sets in the IP routing sublayer (link-local IP addresses).

Figure 13:
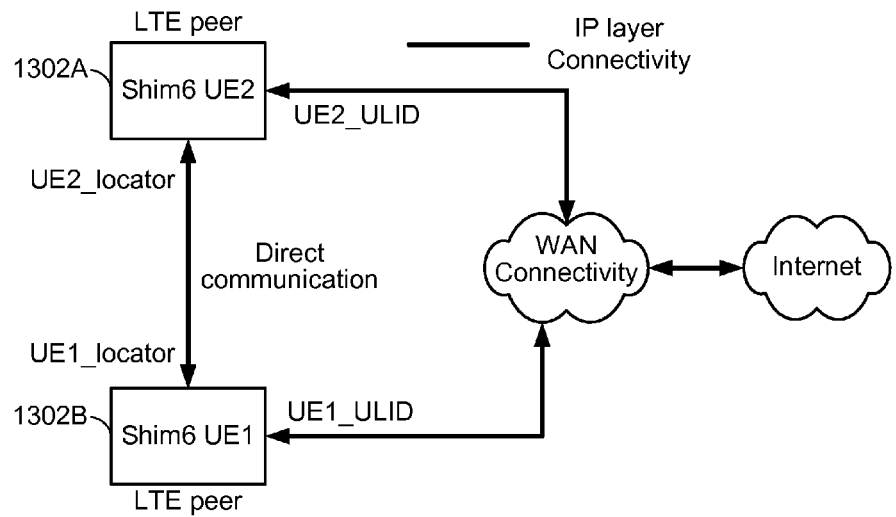
FIG. 13 illustrates an embodiment for establishing ULID and locators in LTE P2P communication.

FIG. 13 illustrates an embodiment for establishing ULID and locators in LTE P2P communication. FIG. 13 shows the paths corresponding to the ULID (UE1_ULID, UE2_ULID) and locators (UE1_locator, UE2_locator) when a direct communication between two peers 1302A, 1302B is established. The ULID for each peer 1302A or 1302B may correspond to the IP address used for Internet connectivity and provided by the network. The UE locators (UE1_locator, UE2_locator) may correspond to the IP addresses allocated for the direct communication (direct IP link).

Figures 14A, 14B:
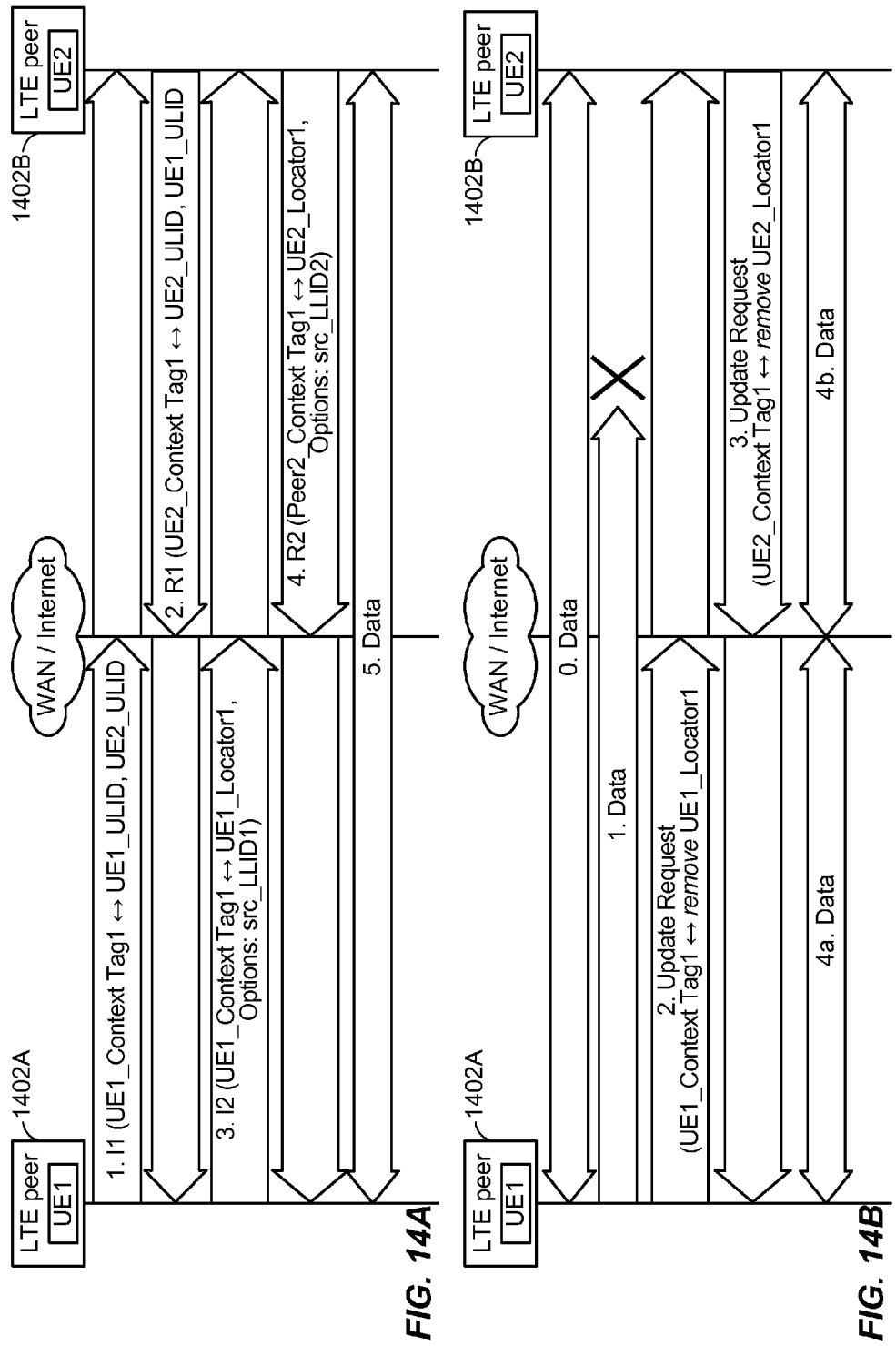
FIGS. 14A-B illustrate embodiments for setting and removing locators for direct communication.

FIGS. 14A-B illustrate embodiments for setting and removing locators for direct communication. Locators may be established when direct communication is established. When a direct communication is established between two peers, both peer UEs have the following information: 1) lower layer information: PDCs or a function of the PDCs that identifies the link; and 2) IP addresses for WAN connectivity (ULIDs), which is either explicitly signaled to each other at peer discovery procedure (or direct communication establishment), or by DNS look-up using the PDC. The Shim6 protocol uses a four-way handshake to authenticate and to create a context between ULIDs and to bind a set of locators to a certain ULID. FIG. 14A shows the call-flow to establish the locators.

At step 1, UE1 1402A sends an I1 message (1st establishment message as initiator) with a context tag, UE1 ULID (WAN IP address) and the UE2 ULID (WAN IP address). Messages 1 and 4 may be sent over the WAN, or through the direct link, with FIG. 14A showing the WAN option. At step 2, UE2 1402B replies with a R1 message (1st establishment message as responder) with a context tag, UE2 ULID (WAN IP address) and the UE1 ULID (WAN IP address). At step 3, UE1 1402A sends an I2 message (2nd establishment message as initiator), with the UE1 locator linked to the context tag from step 1. The UE1 locator is the IP address allocated to the direct IP link between the two peers. Additionally, in the Options field, a lower layer identifier is included. This lower layer identifier (LLID) is a function of the peer PDCs and is used in the unlikely event that two different UEs have set a direct communication with UE2 1402B with the same link local IP address. The source LLID1 helps UE2 1402B determine the link UE1 1402A is referring to. At step 4, UE2 1402B sends an I2 message (2nd establishment message as responder), with the UE2 locator linked to the context tag from step 2. The UE2 locator is the IP address allocated to the direct IP link between the two peers. Additionally, in the Options field, a lower layer identifier is included. This lower layer identifier (LLID) is a function of the peer PDCs and is used in the unlikely event that two different UEs have set a direct communication with UE2 1402B with the same link local IP address. The source LLID helps UE1 know the link UE21 is referring to. At step 5, peer-to-peer data between the two UEs 1402A, 1402B is sent through the direct link.

Locators may be removed when direct communication is lost. When the two peer UEs 1402A, 1402B move out of range, or for some reason the direct communication is lost, the peer communication is recovered at the IP layer by removing the locators pointing to the direct link at the routing sub layer. FIG. 14B shows the call flow for this case.

In FIG. 14B, at step 0, data communication between peer UEs 1402A, 1402B is sent through the direct link, where locators for the link have been established as described with respect to FIG. 14A. At step 1, direct communication is lost. This is detected by an explicit indication from the lower layers of the peer UE or via detection intrinsic to the Shim6 protocol (via probe messages). At step 2, the UE1 1402A sends an update request through the WAN (or the Internet) to remove the UE1 locator. When receiving this message, UE2 1402B removes the locator for UE1 1402A. Since there are no locators left for UE1 1402A, UE2 1402B may use the ULID1 for routing IP packets to UE1. At step 3, UE2 1402B sends an update request through the WAN (or the Internet) removing the UE2 locator. When receiving this message, UE1 1402A removes the locator for UE2 1402B. Since there are no locators left for UE1 1402A, UE2 1402B may use the ULID2 for routing IP packets to UE2. At step 4, peer-to-peer data between the two UEs 1402A, 1402B may be sent through the WAN.

Figure 15A:
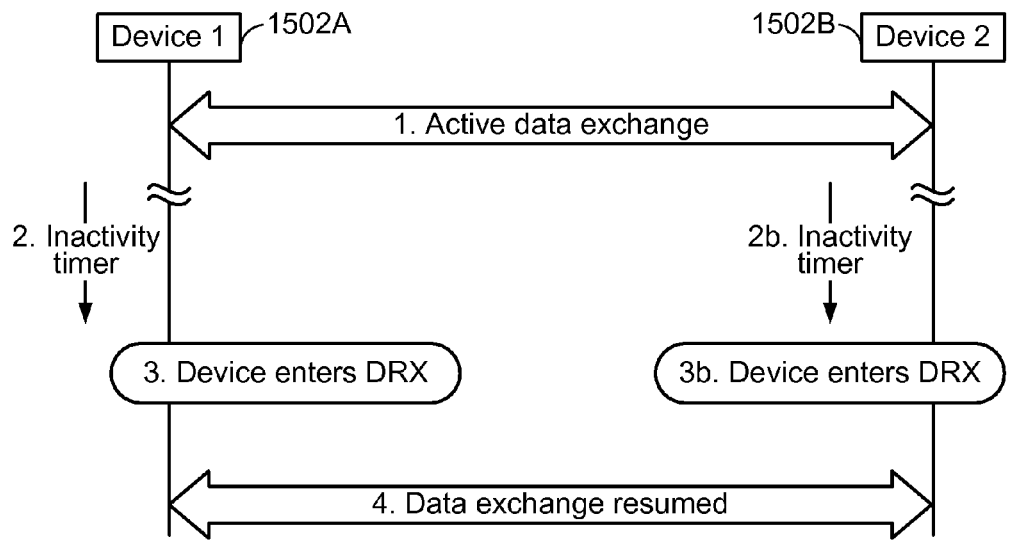
FIGS. 15A-B illustrate embodiments for P2P discontinuous reception (DRX) using an inactivity timer.
Figure 15B:
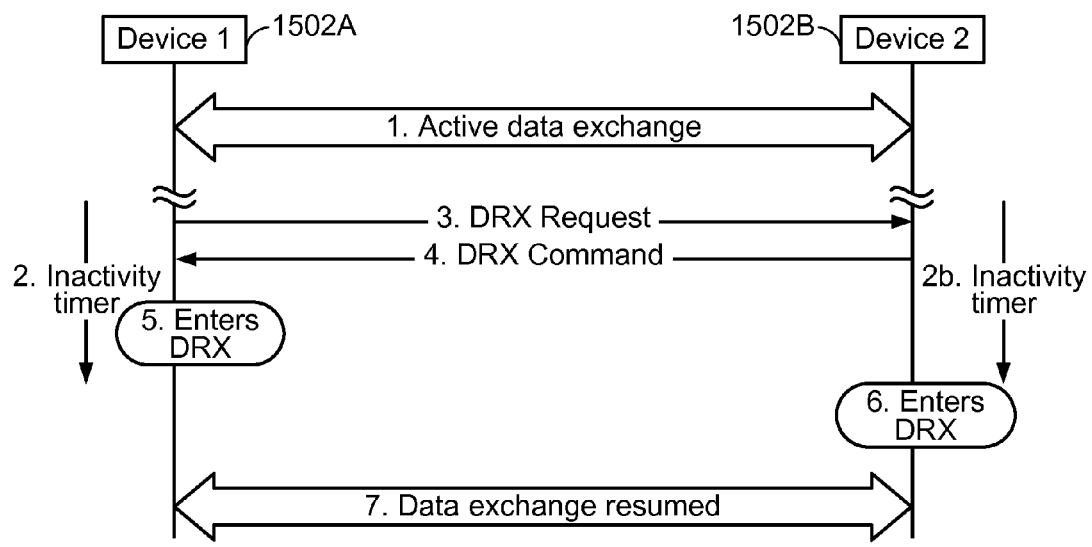

FIGS. 15A-B illustrate embodiments for P2P discontinuous reception (DRX) using an inactivity timer. DRX mode may be used by a device to save battery power by not monitoring the physical layer interlace when there is an opportunity to avoid monitoring the physical layer interface. LTE DRX may be used, in which the eNB configures the Long DRX cycle and Short DR cycle that the UE may follow. The following describes how it may work in P2P for a Long DRX cycle (Short DRX cycle support may be provided as well).

P2P devices may be synchronized at the upper layer (e.g., both sides have the concept of SFN or something similar). A DRX cycle may be defined based on the SFN number with some offset that specifies where the cycle starts, just as in LTE. A symmetrical DRX model for P2P may be used so either P2P device may configure the other P2P device for DRX, command the other device to enter DRX, and request the other device that it wants to enter DRX. However, DRX parameters may be the same for both devices. Different DRX parameters for both devices are FFS (e.g., a manager wakes up more often than a client so any client-initiated data will experience less delay. This case may be useful since most likely it's the client that is trying to re-establish some upper layer session).

P2P DRX works as follows. Both devices monitor packet transmission and reception. Whenever there is packet transmission/reception, the device starts a DRX_inactivity timer that is configured during connection establishment (along with other DRX parameters). When the DRX_inactivity timer expires, the device enters DRX. In addition to the above, the device may command its peer to enter DRX (using the DRX Command). Also, the device may send a request to its peer to request entering DRX. The peer device may reply with 'Yes' using DRX Command, or the peer can reply with 'No', in which case the device may have to stay in an active mode.

FIG. 15A shows one embodiment for P2P discontinuous reception (DRX) using an inactivity timer. At step 1, active data exchange is occurring between two devices 1502A, 1502B. At step 2, device 1 1502A detects no more data exchange, and starts the inactivity timer. At step 2b, device 2 1502B also detects no more data exchange, and starts the inactivity timer. At step 3, the inactivity timer expires at device 1 1502A. Device 1 1502A then enters DRX. At step 3b, the inactivity timer expires at device 2 1502B. Device 2 1502B then enters DRX. At step 4, data exchange resumes (at some ON period of DRX).

FIG. 15B shows another embodiment for P2P discontinuous reception (DRX) using an inactivity timer. At step 1, active data exchange is occurring between two devices 1502A, 1502B. At step 2, no more data exchange occurs and the inactivity timer is started in device 1 1502A. At step 2b, the inactivity timer starts at device 2 1502B. At step 3, device 1 1502A determines to enter DRX before its inactivity timer expires. It may send a DRX Request to device 2 1502B. At step 4, device 2 1502B determines it has no data for device 1 1502A. Device 2 1502B sends a DRX Command to device 1 1502A. Device 2 1502B may also send a DRX Command to device 1 1502A autonomously without any DRX Request from Device 1 1502A. At step 5, device 1 1502A enters DRX upon reception of the DRX Command. Device 1 1502A stops and resets its inactivity timer. At step 6, the inactivity timer expires at device 2 1502B. Device 2 1502B then enters DRX also. At step 7, data exchange resumes (at some ON period of DRX).

Figure 16A:
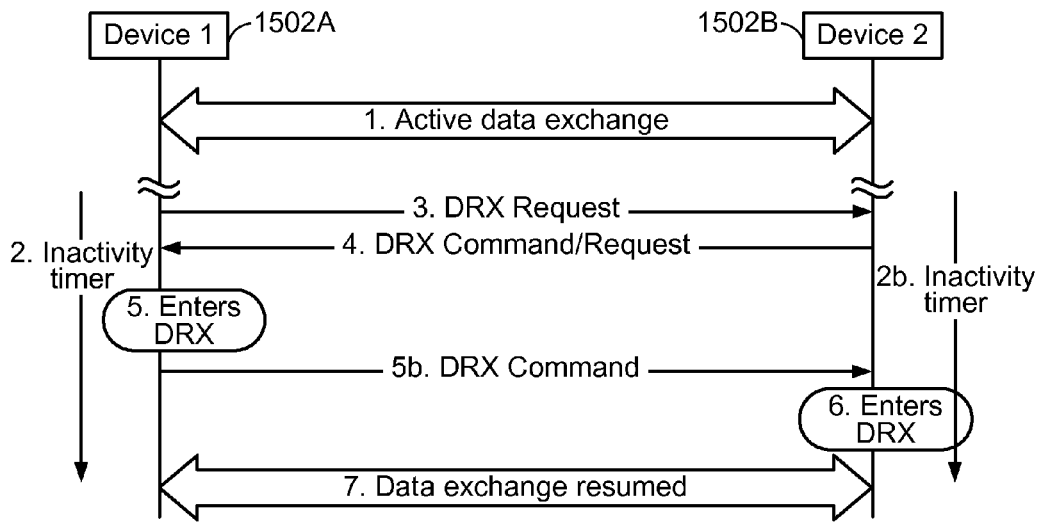
FIGS. 16A-B illustrate two embodiments for P2P DRX Command transmission by both P2P devices.
Figure 16B:
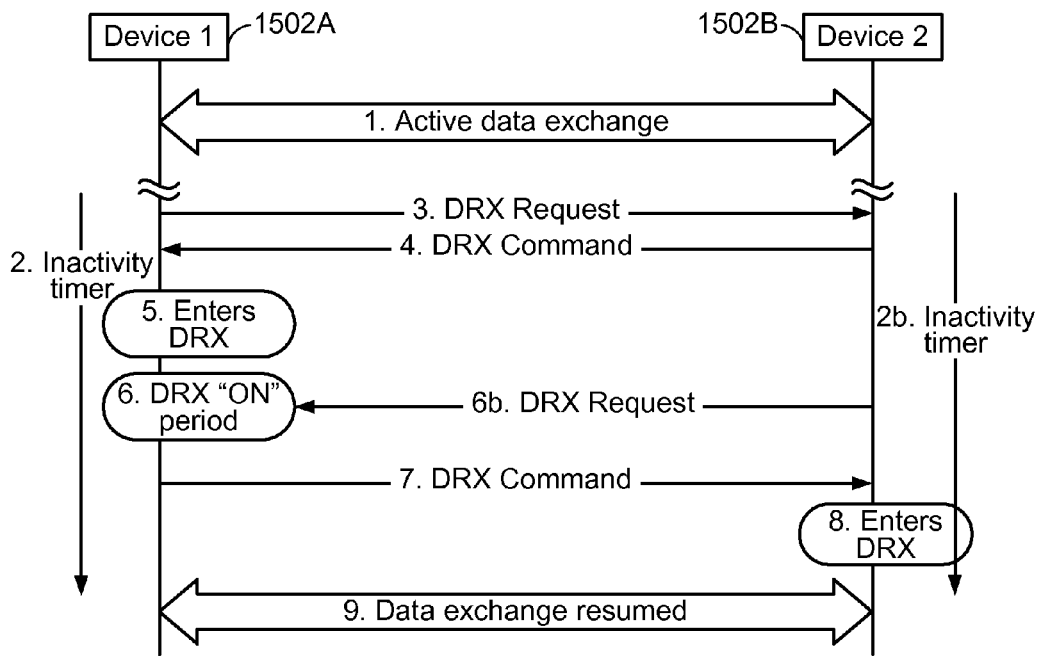

FIGS. 16A-B illustrate two embodiments for P2P DRX Command transmission by both P2P devices. In one embodiment shown in FIG. 16A, at step 1, active data exchange is occurring between the two devices 1502A, 1502B. At step 2, no more data exchange occurs and the inactivity timer is started in device 1 1502A. At step 2b, the inactivity timer starts at device 2 1502B. At step 3, device 1 1502A determines to enter DRX before its inactivity timer expires. It may send a DRX Request to device 2 1502B. At step 4, device 2 1502B determines is has no data for device 1 1502A. Device 2 1502B sends a DRX Command to device 1 1502A. Device 2 1502B may also want to enter DRX so device 2 1502B sends a DRX Command and a DRX Request in one message to device 1 1502A. At step 5, device 1 1502A enters DRX upon reception of the DRX Command. Device 1 1502A stops and resets its inactivity timer. Device 1 1502 then sends a DRX command to device 2 1502B. At step 6, device 2 1502B receives the DRX command, enters DRX, and stops and resets its inactivity timer. At step 7, data exchange resumes (at some ON period of DRX).

In another embodiment shown in FIG. 16B, at step 1, active data exchange is occurring between the two devices 1502A, 1502B. At step 2, no more data exchange occurs and the inactivity timer is started in device 1 1502A. At step 2b, the inactivity timer starts at device 2 1502B. At step 3, device 1 1502A determines to enter DRX before its inactivity timer expires. It may send a DRX Request to device 2 1502B. At step 4, device 2 1502B determines it has no data for device 1 1502A. Device 2 1502B sends a DRX Command to device 1 1502A. At step 5, device 1 1502A enters DRX upon reception of the DRX Command. Device 1 1502A stops and resets its inactivity timer. Device 1 1502A sends a DRX command to device 2 1502B. At step 6, DRX enters an "ON" period. At step 6b, device 2 1502B determines to enter DRX. Device 2 1502B sends a DRX Request to device 1 1502A. At step 7, device 1 1502A sends a DRX Command to device 2 1502B. At step 8, device 2 1502B receives the DRX command, enters DRX, and stops and resets its inactivity timer. At step 9, data exchange resumes (at some ON period of DRX).

Figure 17:
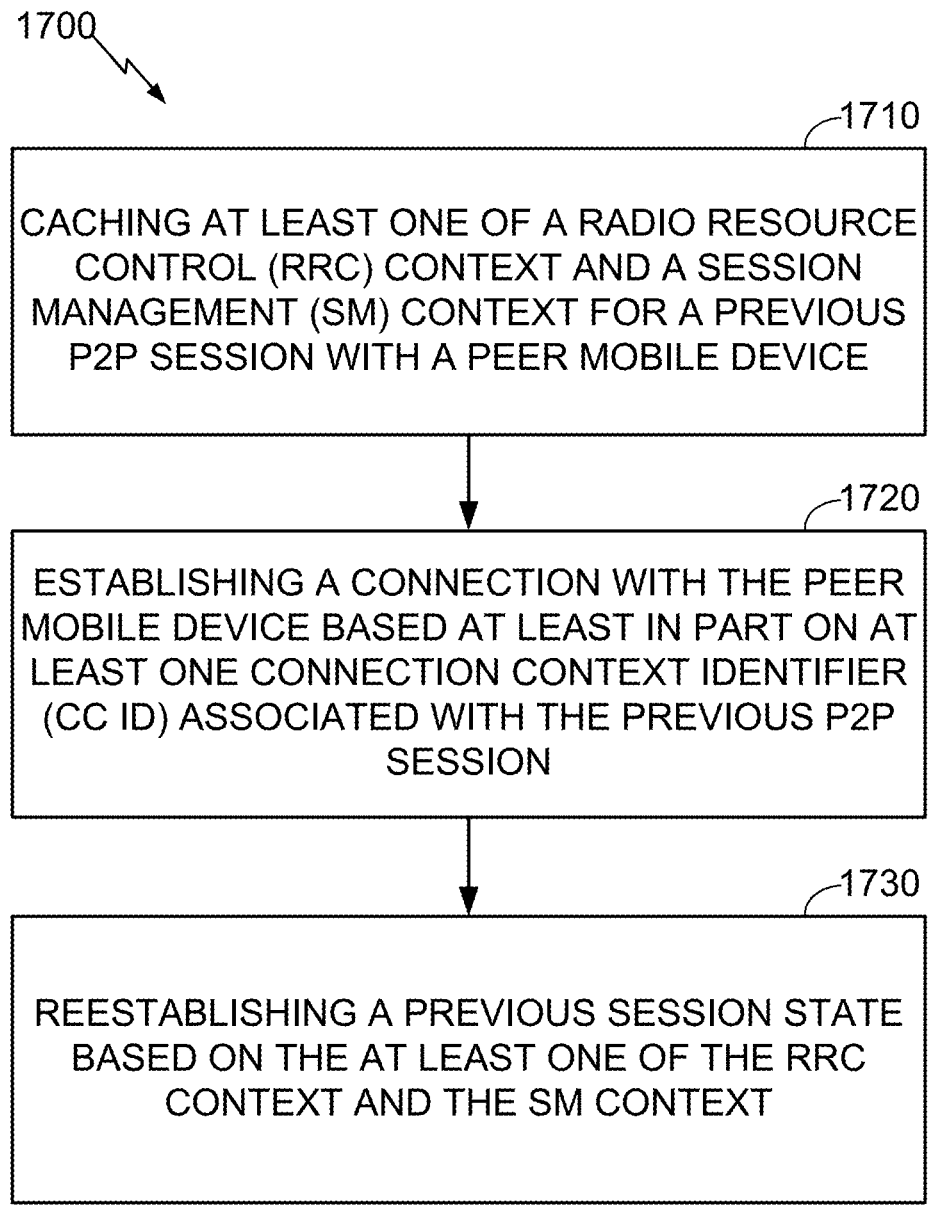
FIG. 17 shows a methodology for P2P connection reestablishment by a mobile entity.

In accordance with one or more aspects of the subject of this disclosure, there are provided methods for P2P connection reestablishment by a mobile device (e.g., a UE). With reference to FIG. 17, illustrated is a methodology 1700 that may be performed at a client device or a manager device. The method 1700 may involve, at 1710, caching at least one of an RRC context and an SM context for a previous P2P session with a peer mobile device. For example, the RRC context may include information relating to MAC configuration, PDCP configuration, and/or RLC configuration. The method 1700 may involve, at 1720, establishing a connection with the peer mobile device based at least in part on at least one CC ID associated with the previous P2P session. The method 1700 may involve, at 1730, reestablishing a previous session state based on the at least one of the RRC context and the SM context.

In one embodiment, the mobile device may be a client device, and the peer mobile device may be a manager device. The client device may have a given CC ID for identifying the at least one of the RRC context and the SM context to the manager device (e.g., a first CC ID for identifying the RRC context and/or a second CC ID for identifying the SM context). The given CC ID may be assigned by the manager device. In the alternative, the manager device may have a given CC ID for identifying the at least one of the RRC context and the SM context to the client device (e.g., a first CC ID for identifying the RRC context and/or a second CC ID for identifying the SM context). The given CC ID may be assigned by the client device.

In another embodiment, the mobile device may be a manager device, and the peer mobile device may be a client device. The client device has a given CC ID for identifying the at least one of the RRC context and the SM context to the manager device (e.g., a first CC ID for identifying the RRC context and/or a second CC ID for identifying the SM context). The given CC ID is assigned by the manager device. In the alternative, the manager device may have a given CC ID for identifying the at least one of the RRC context and the SM context to the client device (e.g., a first CC ID for identifying the RRC context and/or a second CC ID for identifying the SM context). The given CC ID may be assigned by the client device.

Figure 18:
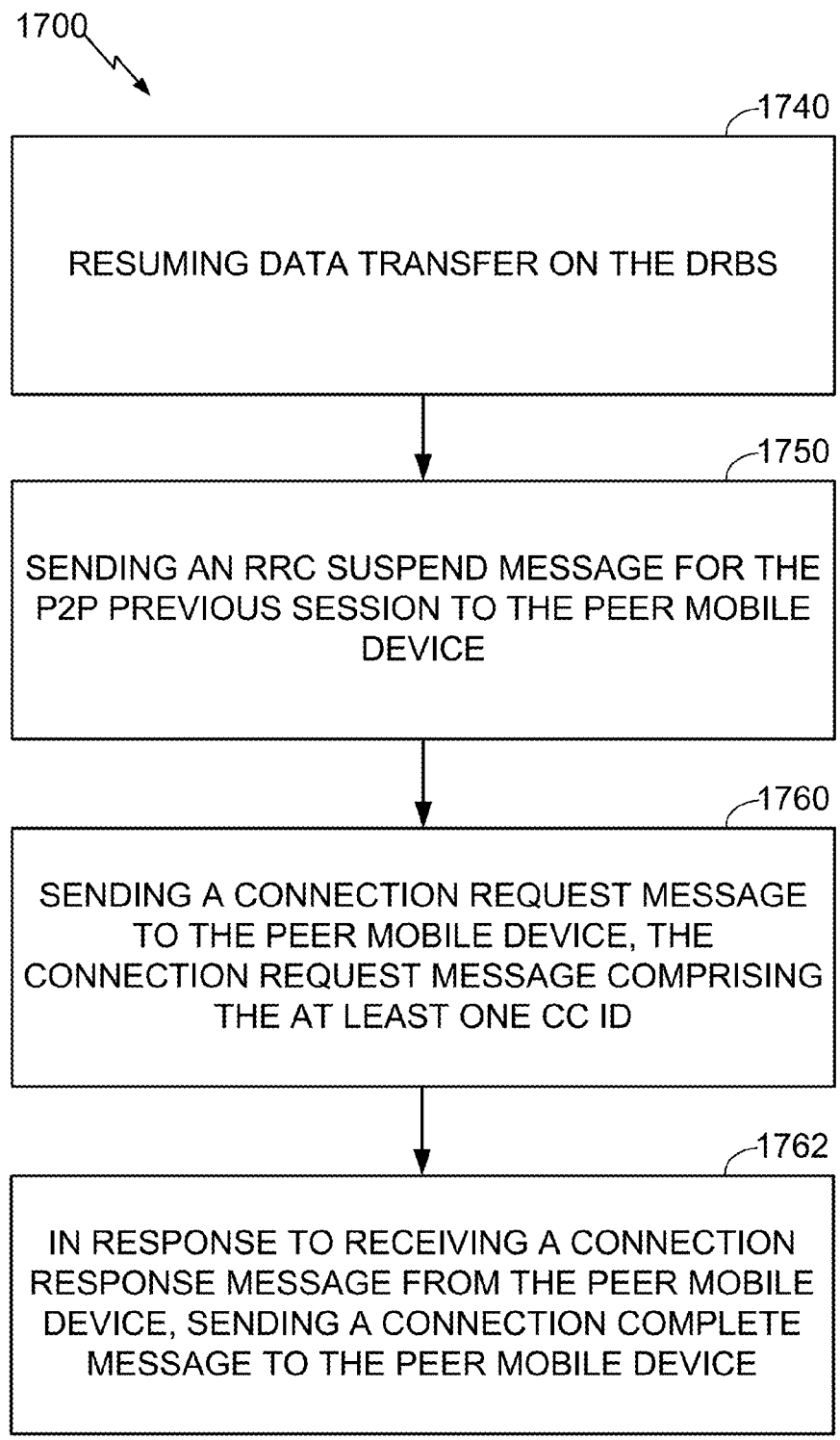
FIGS. 18-24 show further aspects of the methodology of FIG. 17.

With reference to FIGS. 18-24, there are shown further operations or aspects of method 1700 that are optional and may be performed by a mobile device for P2P connection reestablishment. It is noted that the blocks shown in FIGS. 18-24 are not required to perform the method 1700. If the method 1700 includes at least one block of FIGS. 18-24, then the method 1700 may terminate after the at least one block, without necessarily having to include any subsequent downstream block(s) that may be illustrated. It is further noted that numbers of the blocks do not imply a particular order in which the blocks may be performed according to the method 1700. With reference to FIG. 18, the previous session state may include DRBs associated with the previous P2P session. For example, the DRBs may be based at least in part on information relating to MAC configuration, PDCP configuration, and/or RLC configuration. For example, reestablishing the previous session state may involve, at 1740, resuming data transfer on the DRBs. In related aspects, caching may involve, at 1750, sending an RRC suspend message for the P2P previous session to the peer mobile device.

In further related aspects, establishing the connection may involve, at 1760, sending a connection request message to the peer mobile device, the connection request message comprising the at least one CC ID and, at 1762, in response to receiving a connection response message from the peer mobile device, sending a connection complete message to the peer mobile device. For example, the mobile device may be a client device, and the peer mobile device may be a manager device. In the alternative, the mobile device may be a manager device, and the peer mobile device may be a client device. In another example, the connection request message may include an RRC connection reestablishment request message, the connection response message may include an RRC connection reestablishment response message, and/or the connection complete message may include an RRC connection reestablishment complete message.

Figure 19:
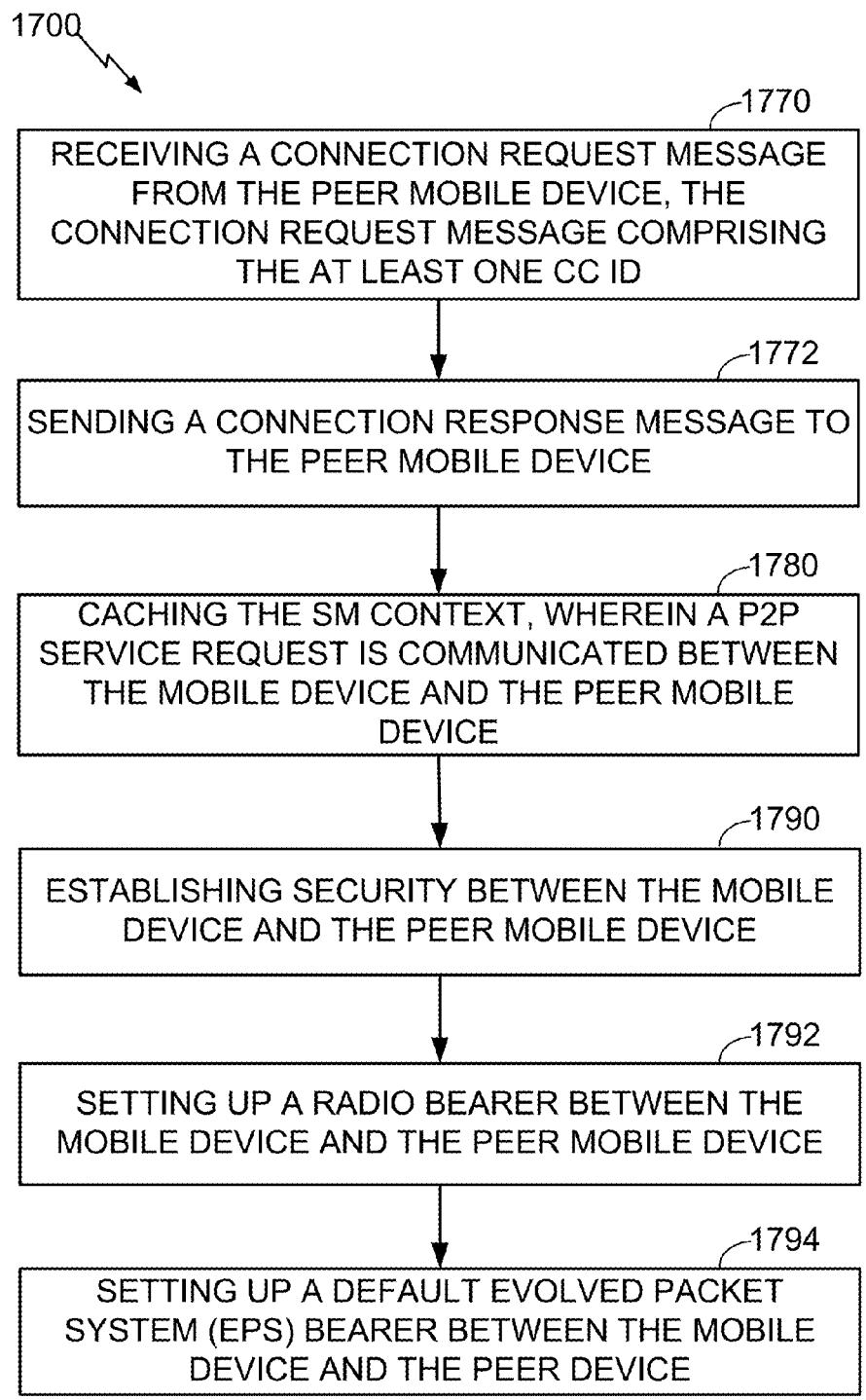

With reference to FIG. 19, establishing the connection may involve, at 1770, receiving a connection request message from the peer mobile device, the connection request message comprising the at least one CC ID and, at 1772, sending a connection response message to the peer mobile device. In related aspects, caching may involve, at 1780, caching the SM context, wherein a P2P service request is communicated between the mobile device and the peer mobile device. In further related aspects, reestablishing the previous session state may involve, at 1790, establishing security between the mobile device and the peer mobile device and, at 1792, setting up a radio bearer between the mobile device and the peer mobile device. Reestablishing the previous session state may also involve, at 1794, setting up a default EPS bearer between the mobile device and the peer device.

Figure 20:
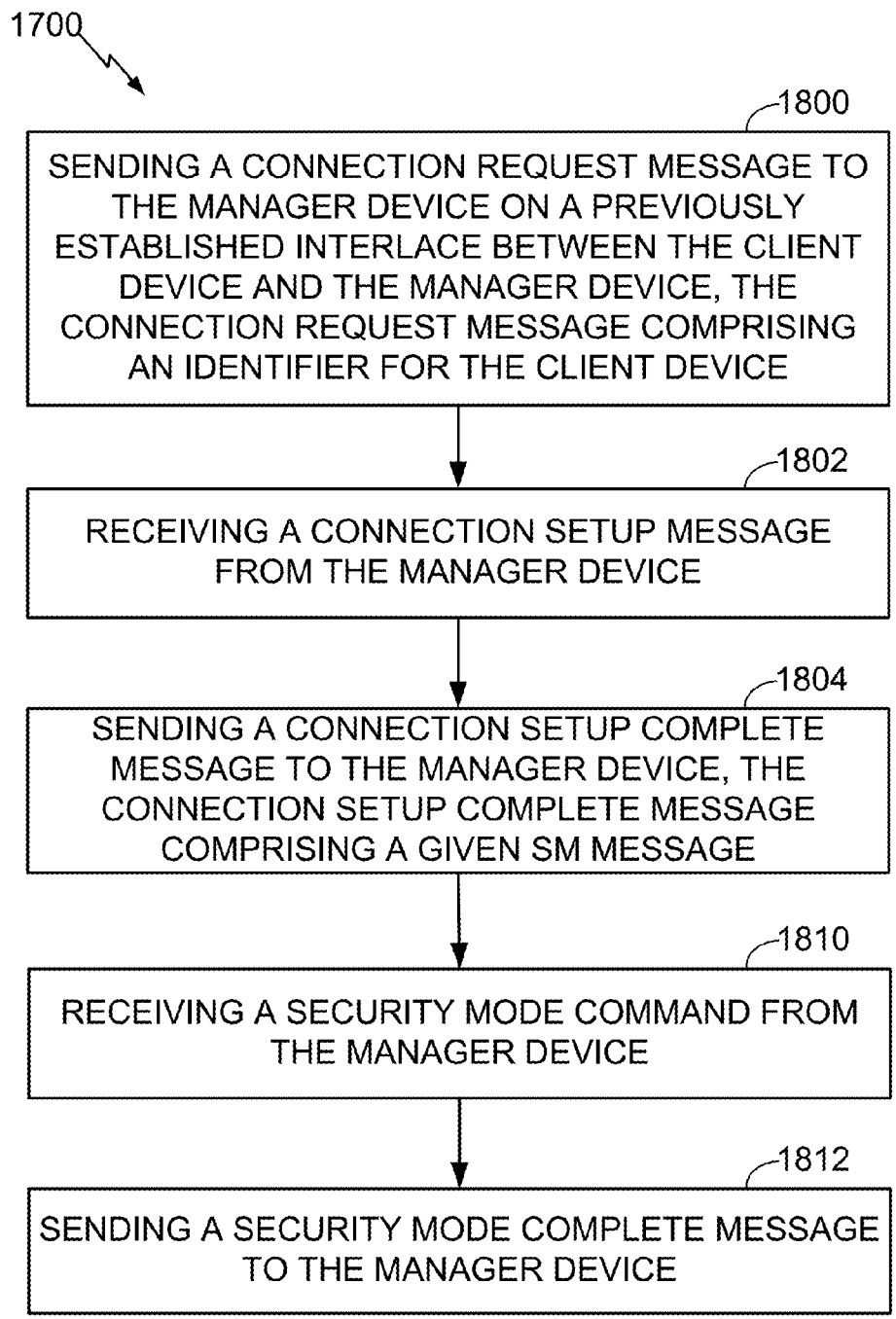

With reference to FIG. 20, in an embodiment where the mobile device is a client device, and the peer mobile device is a manager device, establishing the connection may involve, at 1800, sending a connection request message to the manager device on a previously established interlace between the client device and the manager device, the connection request message comprising an identifier for the client device. Establishing the connection may further involve, at 1802, receiving a connection setup message from the manager device and, at 1804, sending a connection setup complete message to the manager device, the connection setup complete message comprising a given SM message. In related aspects, establishing the security may involve, at 1810, receiving a security mode command from the manager device and, at 1812, sending a security mode complete message to the manager device.

Figure 21:
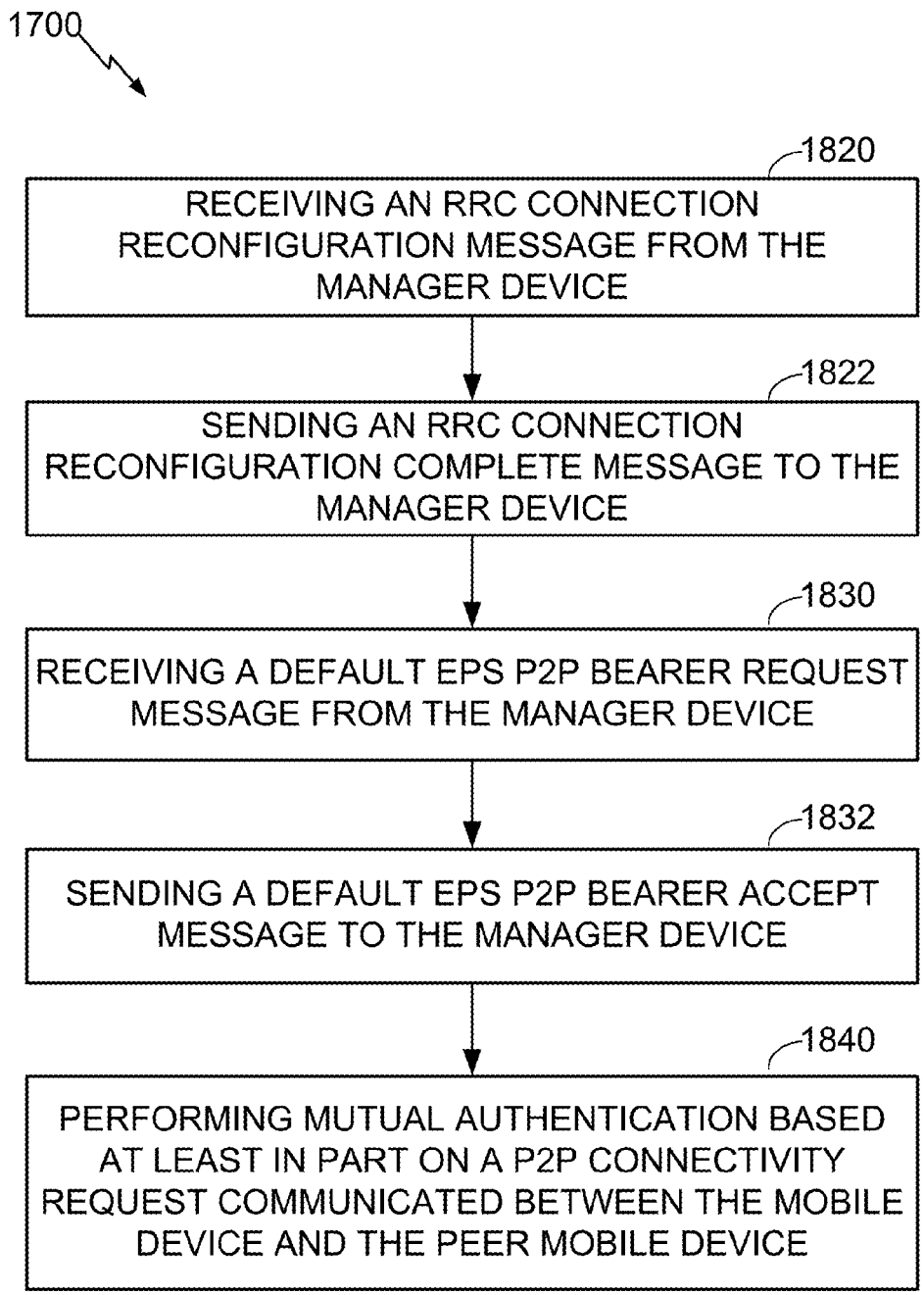

With reference to FIG. 21, in further related aspects, setting up the radio bearer may involve, at 1820, receiving an RRC connection reconfiguration message from the manager device and, at 1822, sending an RRC connection reconfiguration complete message to the manager device. In yet further related aspects, setting up the EPS bearer may involve, at 1830, receiving a default EPS P2P bearer request message from the manager device and, at 1832, sending a default EPS P2P bearer accept message to the manager device. In still further related aspects, the method 1700 may further involve performing mutual authentication based at least in part on a P2P connectivity request communicated between the mobile device and the peer mobile device, at 1840.

Figure 22:
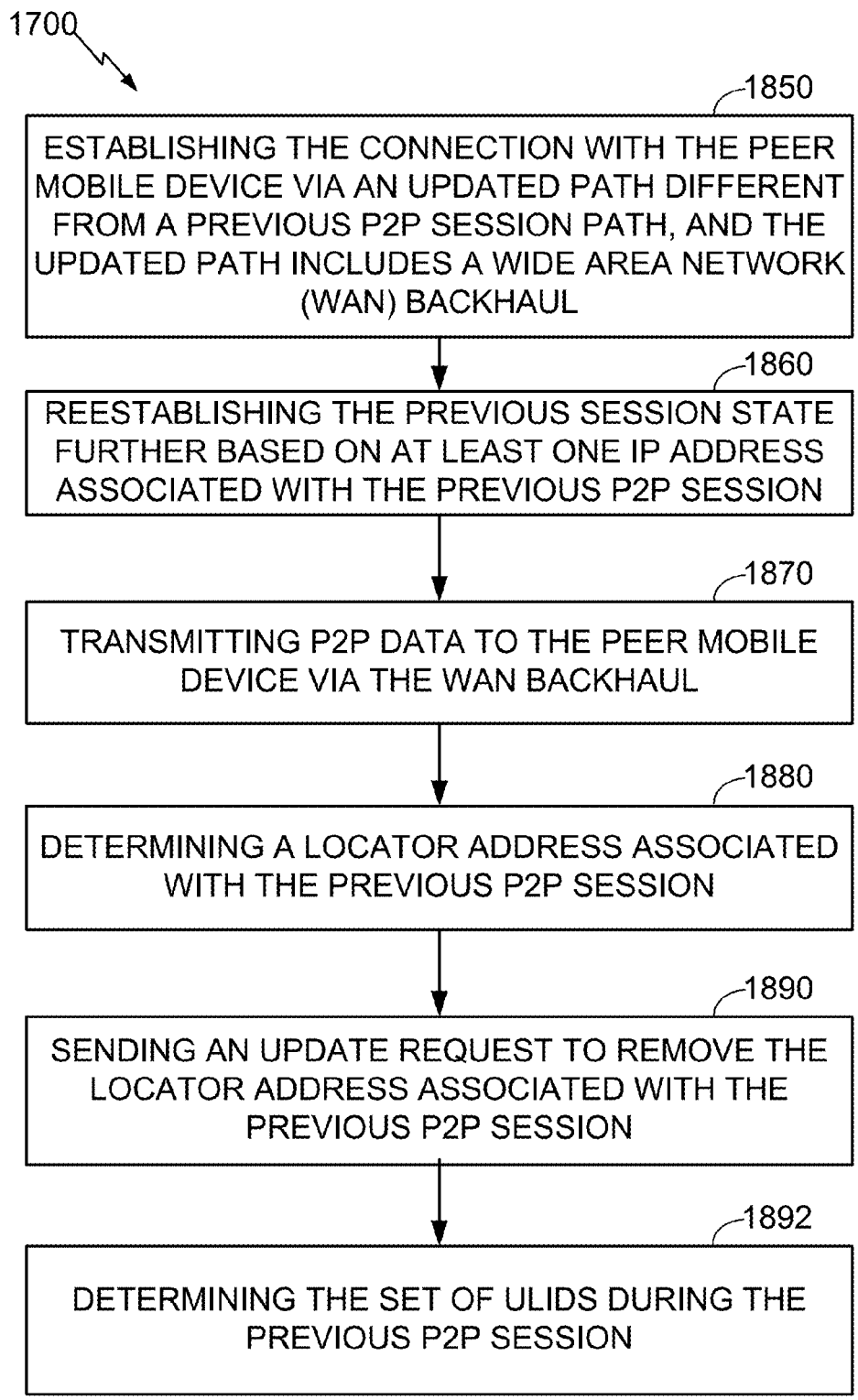

With reference to FIG. 22, in further related aspects, the methodology 1700 may further involve, at 1850, establishing the connection with the peer mobile device via an updated path different from a previous P2P session path, and the updated path includes a wide area network (WAN) backhaul and, at 1860, reestablishing the previous session state further based on at least one IP address associated with the previous P2P session. In yet further related aspects, the methodology 1700 may further involve, at 1870, transmitting P2P data to the peer mobile device via the WAN backhaul and, at 1880, determining a locator address associated with the previous P2P session. In still further related aspects, the method 1700 may further involve, at 1890, sending an update request to remove the locator address associated with the previous P2P session and, at 1892, determining the set of ULIDs during the previous P2P session.

Figure 23:
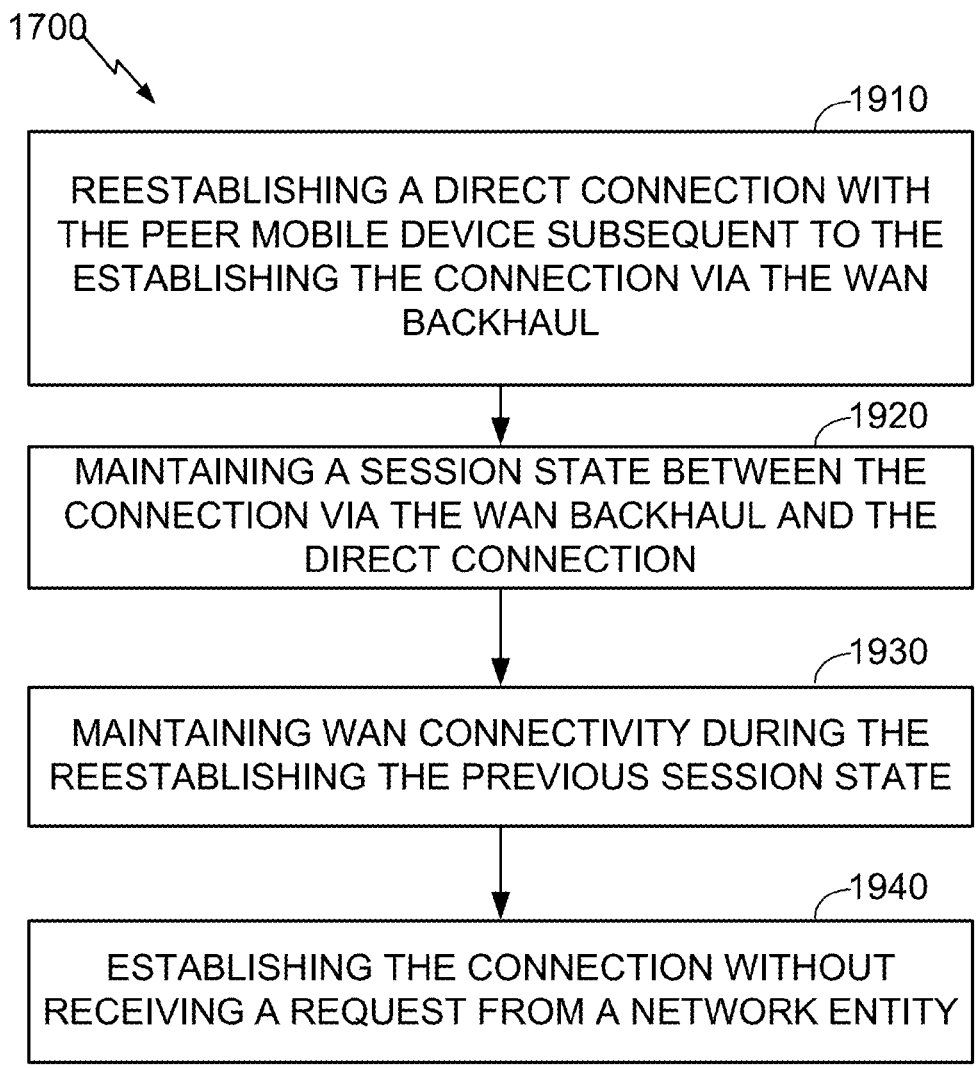

With reference to FIG. 23, in further related aspects, the methodology 1700 may further involve, at 1910, reestablishing a direct connection with the peer mobile device subsequent to the establishing the connection via the WAN backhaul and, at 1920, maintaining a session state between the connection via the WAN backhaul and the direct connection. In yet further related aspects, the methodology 1700 may further involve, at 1930, maintaining WAN connectivity during the reestablishing the previous session state and, at 1940, establishing the connection without receiving a request from a network entity.

Figure 24:
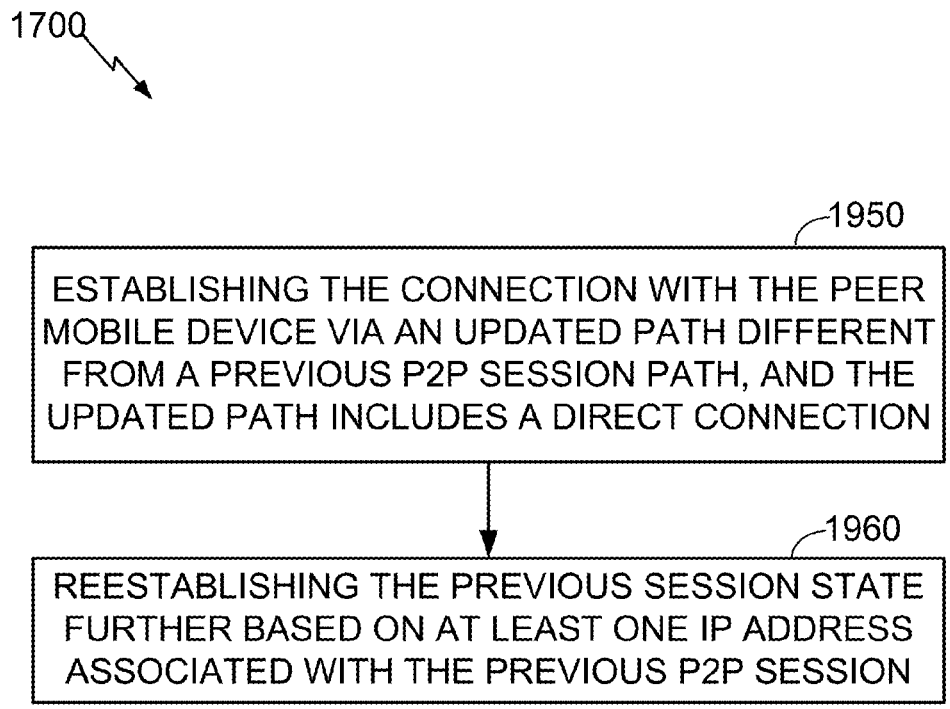

With reference to FIG. 24, in further related aspects, the methodology 1700 may further involve, at 1950, establishing the connection with the peer mobile device via an updated path different from a previous P2P session path, and the updated path includes a direct connection and, at 1960, reestablishing the previous session state further based on at least one IP address associated with the previous P2P session.

Figure 25:
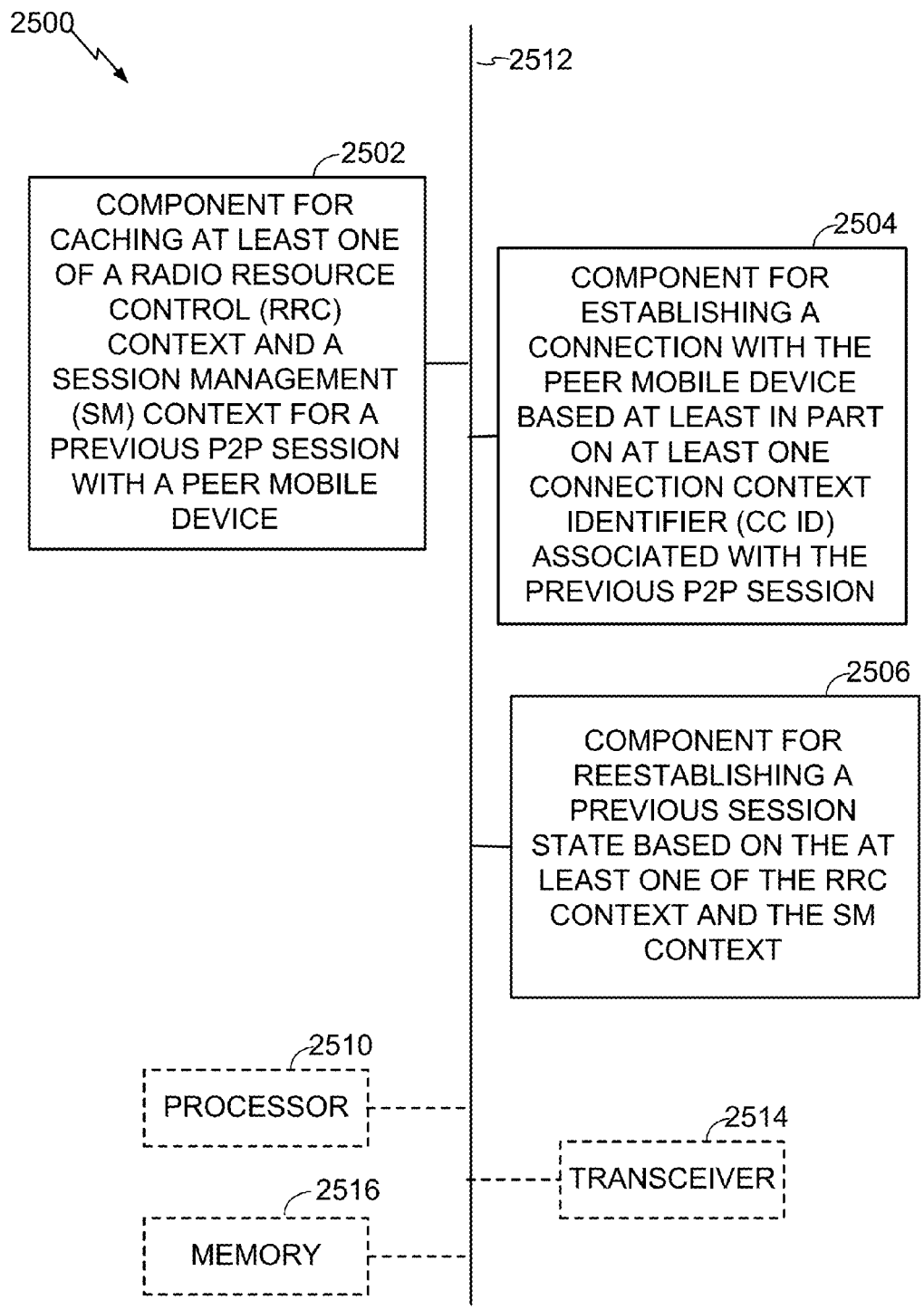
FIG. 25 shows an apparatus for P2P connection reestablishment, in accordance with the methodology of FIGS. 17-24.

In accordance with one or more aspects of the embodiments described herein, there are provided devices and apparatuses for P2P connection reestablishment, as described above with reference to FIGS. 17-24. With reference to FIG. 25, there is provided an exemplary apparatus 2500 that may be configured as a mobile entity/device, in a wireless network, or as a processor or similar device for use within the mobile entity. The apparatus 2500 may include functional blocks that can represent functions implemented by a processor, software, or combination thereof (e.g., firmware). For example, the apparatus 2500 of FIG. 25 may comprise an electrical component or module 2502 for caching at least one of an RRC context and an SM context for a previous P2P session with a peer mobile device. For example, the electrical component or module 2502 may be, or may include, a means for caching at least one of an RRC context and an SM context for a previous P2P session with a peer mobile device. Said means may be or may include at least one processor (e.g., processor 270) or processor coupled to memory (e.g., processor 270 and memory 272) operating an algorithm. The algorithm may include, for example, the methodology of FIGS. 17-24 and embodiment of FIG. 10 or variations thereof.

The apparatus 2500 may comprise an electrical component 2504 for establishing a connection with the peer mobile device based at least in part on at least one CC ID associated with the previous P2P session. For example, the electrical component or module 2504 may be, or may include, a means for establishing a connection with the peer mobile device based at least in part on at least one CC ID associated with the previous P2P session. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 10 or variations thereof.

The apparatus 2500 may comprise an electrical component 2506 for reestablishing a previous session state based on the at least one of the RRC context and the SM context. For example, the electrical component or module 2506 may be, or may include, a means for reestablishing a previous session state based on the at least one of the RRC context and the SM context. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 10 or variations thereof.

In related aspects, the apparatus 2500 may optionally include a processor component 2510 having at least one processor, in the case of the apparatus 2500 configured as a network entity, rather than as a processor. The processor 2510, in such case, may be in operative communication with the components 2502-2506 via a bus 2512 or similar communication coupling. The processor 2510 may effect initiation and scheduling of the processes or functions performed by electrical components 2502-2506.

In further related aspects, the apparatus 2500 may include a radio transceiver component 2514. A stand alone receiver and/or stand alone transmitter may be used in lieu of or in conjunction with the transceiver 2514. The apparatus 2500 may optionally include a component for storing information, such as, for example, a memory device/component 2516. The computer readable medium or the memory component 2516 may be operatively coupled to the other components of the apparatus 2500 via the bus 2512 or the like. The memory component 2516 may be adapted to store computer readable instructions and data for effecting the processes and behavior of the components 2502-2506, and subcomponents thereof, or the processor 2510, or the methods disclosed herein. The memory component 2516 may retain instructions for executing functions associated with the components 2502-2506. While shown as being external to the memory 2516, it is to be understood that the components 2502-2506 can exist within the memory 2516.

Figure 26:
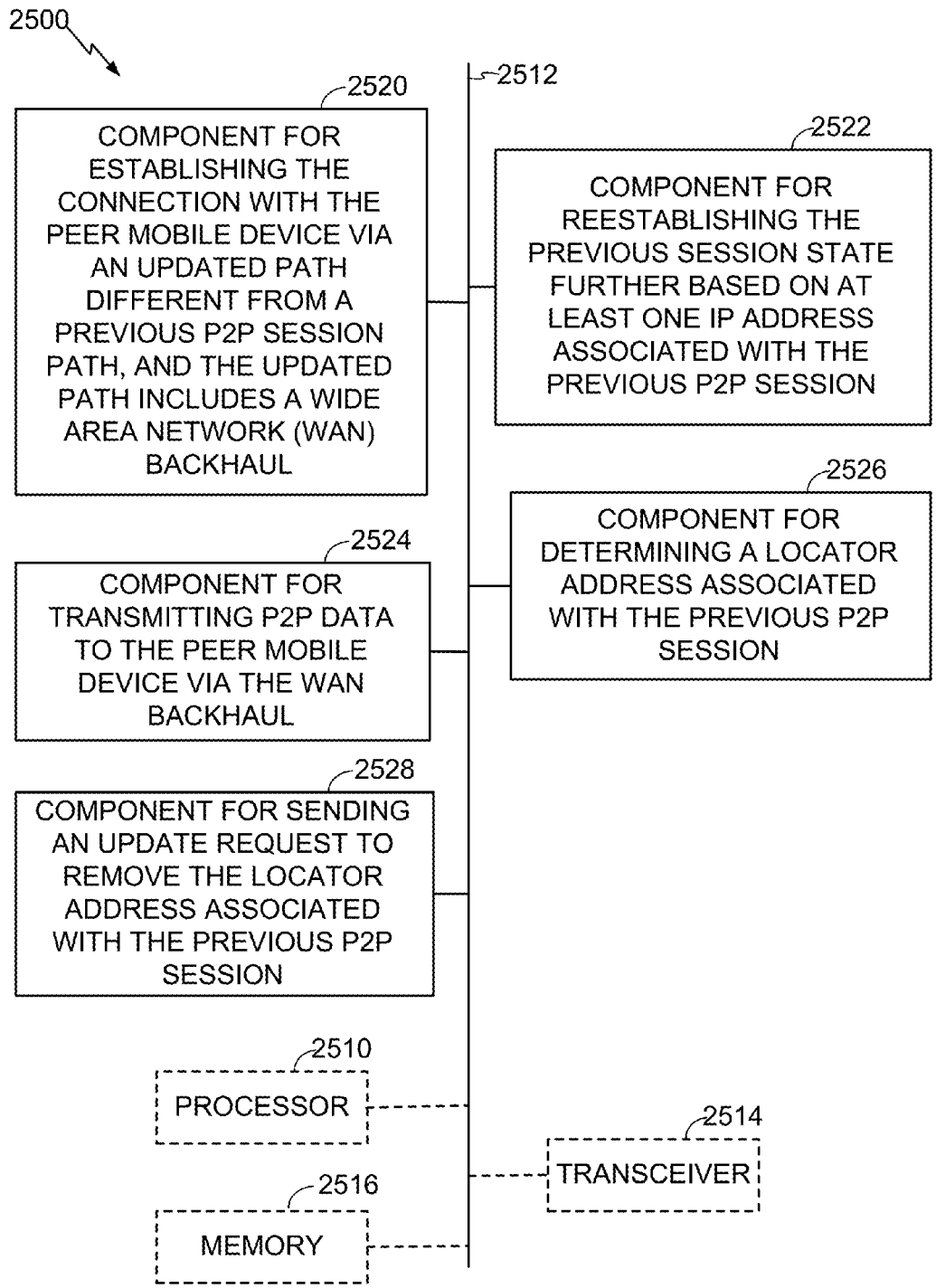
FIGS. 26 and 27 show further aspects of the apparatus of FIG. 25.

With reference to FIG. 26, in further related aspects, apparatus 2500 may further comprise, for example, an electrical component or module 2520 for establishing the connection with the peer mobile device via an updated path different from a previous P2P session path, and the updated path includes a wide area network (WAN) backhaul. For example, the electrical component or module 2520 may be, or may include, a means for establishing the connection with the peer mobile device via an updated path different from a previous P2P session path, and the updated path includes a wide area network (WAN) backhaul. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 11B or variations thereof.

The apparatus 2500 may comprise an electrical component 2522 for reestablishing the previous session state further based on at least one IP address associated with the previous P2P session. For example, the electrical component or module 2522 may be, or may include, a means for reestablishing the previous session state further based on at least one IP address associated with the previous P2P session. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 10 or variations thereof.

The apparatus 2500 may comprise an electrical component 2524 for transmitting P2P data to the peer mobile device via the WAN backhaul. For example, the electrical component or module 2524 may be, or may include, a means for transmitting P2P data to the peer mobile device via the WAN backhaul. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 11B or variations thereof.

The apparatus 2500 may comprise an electrical component 2526 for determining a locator address associated with the previous P2P session. For example, the electrical component or module 2526 may be, or may include, a means for determining a locator address associated with the previous P2P session. Said means may be or may include at least one processor (e.g., processor 270) operating an algorithm. The algorithm may include, for example, the methodology of FIGS. 17-24 and aspects of FIGS. 12, 13 or variations thereof.

The apparatus 2500 may comprise an electrical component 2528 for sending an update request to remove the locator address associated with the previous P2P session. For example, the electrical component or module 2528 may be, or may include, a means for sending an update request to remove the locator address associated with the previous P2P session. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 14B or variations thereof.

Figure 27:
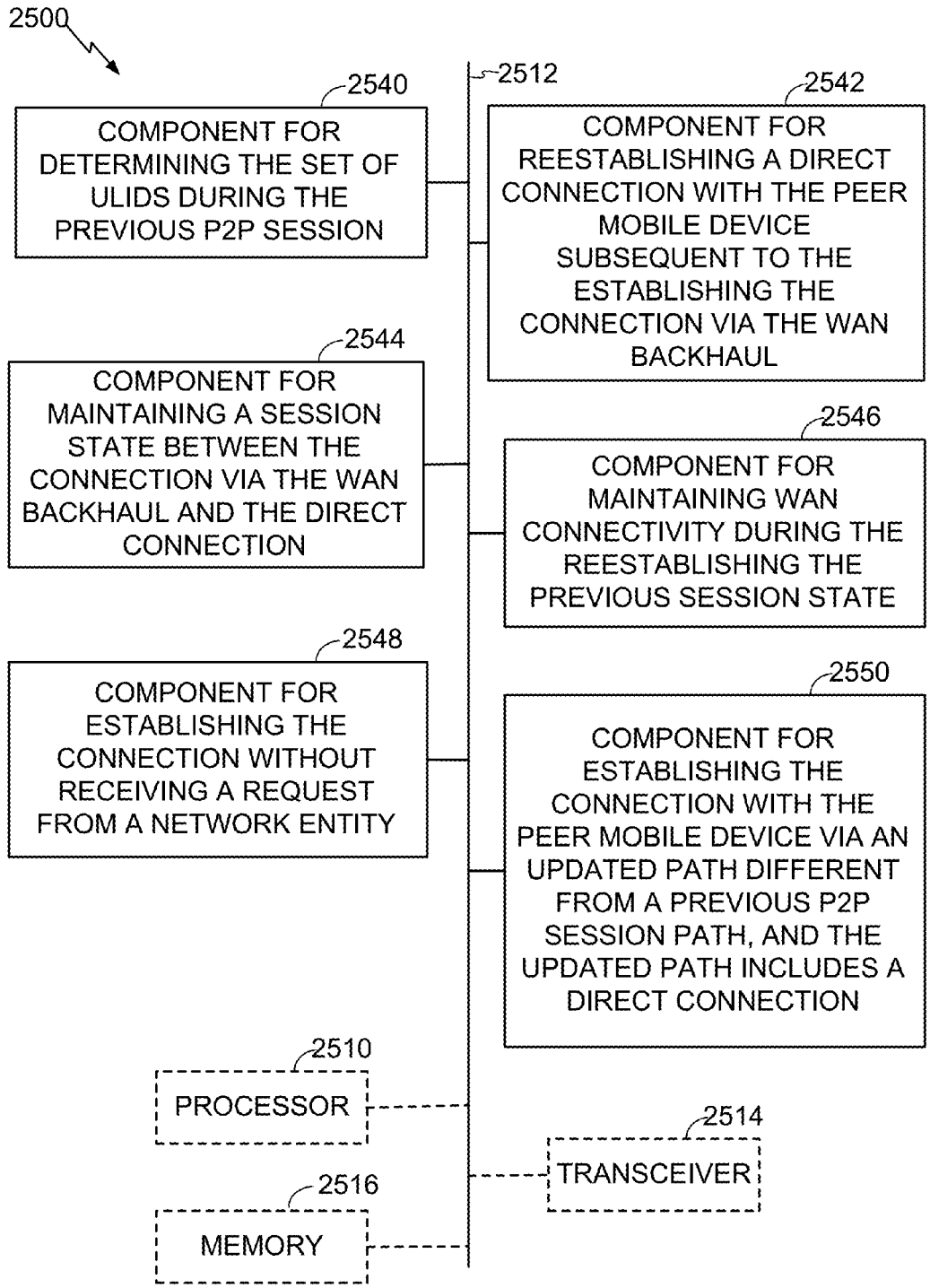

With reference to FIG. 27, in further related aspects, apparatus 2500 may further comprise, for example, an electrical component or module 2540 for determining the set of ULIDs during the previous P2P session. For example, the electrical component or module 2540 may be, or may include, a means for determining the set of ULIDs during the previous P2P session. Said means may be or may include at least one processor (e.g., processor 270) operating an algorithm. The algorithm may include, for example, the methodology of FIGS. 17-24 and aspects of FIGS. 12, 13 or variations thereof.

The apparatus 2500 may comprise an electrical component 2542 for reestablishing a direct connection with the peer mobile device subsequent to the establishing the connection via the WAN backhaul. For example, the electrical component or module 2542 may be, or may include, a means for reestablishing a direct connection with the peer mobile device subsequent to the establishing the connection via the WAN backhaul. Said means may be or may include at least one processor couple to a transmitter (e.g., processor 270 and transmitter(s)/receiver(s) 254a-254r) operating an algorithm.

The algorithm may include, for example, the methodology of FIGS. 17-24 and aspects of FIGS. 11A-B or variations thereof.

The apparatus 2500 may comprise an electrical component 2544 for maintaining a session state between the connection via the WAN backhaul and the direct connection. For example, the electrical component or module 2544 may be, or may include, a means for maintaining a session state between the connection via the WAN backhaul and the direct connection. Said means may be or may include at least one processor (e.g., processor 270) operating an algorithm. The algorithm may include, for example, the methodology of FIGS. 17-24 and aspects of FIGS. 11A-B or variations thereof.

The apparatus 2500 may comprise an electrical component 2546 for maintaining WAN connectivity during the reestablishing the previous session state. For example, the electrical component or module 2546 may be, or may include, a means for maintaining WAN connectivity during the reestablishing the previous session state. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIGS. 11A-B or variations thereof.

The apparatus 2500 may comprise an electrical component 2548 for establishing the connection without receiving a request from a network entity. For example, the electrical component or module 2548 may be, or may include, a means for establishing the connection without receiving a request from a network entity. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIGS. 11A-B or variations thereof.

The apparatus 2500 may comprise an electrical component 2550 for establishing the connection with the peer mobile device via an updated path different from a previous P2P session path, and the updated path includes a direct connection. For example, the electrical component or module 2550 may be, or may include, a means for establishing the connection with the peer mobile device via an updated path different from a previous P2P session path, and the updated path includes a direct connection. Said means may be or may include at least one processor couple to a transmitter (e.g., processor 270 and transmitter(s)/receiver(s) 254a-254r) operating an algorithm. The algorithm may include, for example, the methodology of FIGS. 17-24 and aspects of FIG. 11A or variations thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for peer-to-peer (P2P) connection reestablishment by a mobile device, comprising:
    caching at least one of a Radio Resource Control (RRC) context and a session management (SM) context for a previous P2P session with a peer mobile device and that has been suspended;
    establishing a connection with the peer mobile device based at least in part on at least one connection context identifier (CC ID) associated with the previous P2P session, the connection with the peer mobile device using an updated path different from a previous P2P session path; and
    reestablishing a previous session state based on the at least one of the RRC context and the SM context.

2. The method of claim 1, wherein the updated path includes a wide area network (WAN) backhaul.

3. The method of claim 1, wherein the updated path includes a direct connection.

4. The method of claim 1, wherein reestablishing comprises reestablishing the previous session state further based on at least one IP address associated with the previous P2P session.

5. The method of claim 2, further comprising transmitting P2P data to the peer mobile device via the WAN backhaul.

6. The method of claim 2, further comprising determining a locator address associated with the previous P2P session.

7. The method of claim 6, further comprising sending an update request to remove the locator address associated with the previous P2P session.

8. The method of claim 4, wherein the at least one IP address comprises a set of upper layer identifiers (ULIDs) for WAN connectivity.

9. The method of claim 8, further comprising determining the set of ULIDs during the previous P2P session.

10. The method of claim 2, further comprising reestablishing a direct connection with the peer mobile device subsequent to the establishing the connection via the WAN backhaul.

11. The method of claim 10, further comprising maintaining a session state between the connection via the WAN backhaul and the direct connection.

12. The method of claim 1, further comprising maintaining WAN connectivity during the reestablishing the previous session state.

13. The method of claim 2, wherein establishing comprises establishing the connection without receiving a request from a network entity.

14. An apparatus for peer-to-peer (P2P) connection reestablishment, comprising:
    at least one processor configured to:
        cache at least one of a Radio Resource Control (RRC) context and a session management (SM) context for a previous P2P session with a peer mobile device and that has been suspended;
        establish a connection with the peer mobile device based at least in part on at least one connection context identifier (CC ID) associated with the previous P2P session, the connection with the peer mobile device using an updated path different from a previous P2P session path; and
        reestablish a previous session state based on the at least one of the RRC context and the SM context; and
    a memory coupled to the at least one processor for storing data.

15. The apparatus of claim 14, wherein the updated path includes a wide area network (WAN) backhaul.

16. The apparatus of claim 14, wherein the updated path includes a direct connection.

17. The apparatus of claim 14, wherein the at least one processor is further configured to reestablish the previous session state further based on at least one IP address associated with the previous P2P session.

18. The apparatus of claim 15, further comprising a transmitter configured to transmit P2P data to the peer mobile device via the WAN backhaul.

19. The apparatus of claim 15, wherein the at least one processor is further configured to determine a locator address associated with the previous P2P session.

20. The apparatus of claim 19, wherein the at least one processor is further configured to send an update request to remove the locator address associated with the previous P2P session.

21. The apparatus of claim 17, wherein the at least one IP address comprises a set of upper layer identifiers (ULIDs) for WAN connectivity.

22. The apparatus of claim 21, wherein the at least one processor is further configured to determine the set of ULIDs during the previous P2P session.

23. The apparatus of claim 15, wherein the at least one processor is further configured to reestablish a direct connection with the peer mobile device subsequent to the establishing the connection via the WAN backhaul.

24. The apparatus of claim 23, wherein the at least one processor is further configured to maintain a session state between the connection via the WAN backhaul and the direct connection.

25. The apparatus of claim 14, wherein the at least one processor is further configured to maintain WAN connectivity during the reestablishing the previous session state.

26. The apparatus of claim 15, wherein the at least one processor is further configured to establish the connection without receiving a request from a network entity.

27. An apparatus for peer-to-peer (P2P) connection reestablishment, comprising:
    means for caching at least one of a Radio Resource Control (RRC) context and a session management (SM) context for a previous P2P session with a peer mobile device and that has been suspended;
    means for establishing a connection with the peer mobile device based at least in part on at least one connection context identifier (CC ID) associated with the previous P2P session, the connection with the peer mobile device using an updated path different from a previous P2P session path; and
    means for reestablishing a previous session state based on the at least one of the RRC context and the SM context.

28. The apparatus of claim 27, wherein the updated path includes a wide area network (WAN) backhaul.

29. The apparatus of claim 27, wherein the updated path includes a direct connection.

30. The apparatus of claim 27, wherein the means for establishing is further configured to reestablish the previous session state further based on at least one IP address associated with the previous P2P session.

31. The apparatus of claim 28, further comprising means for transmitting P2P data to the peer mobile device via the WAN backhaul.

32. The apparatus of claim 28, further comprising means for determining a locator address associated with the previous P2P session.

33. The apparatus of claim 32, further comprising means for sending an update request to remove the locator address associated with the previous P2P session.

34. The apparatus of claim 30, wherein the at least one IP address comprises a set of upper layer identifiers (ULIDs) for WAN connectivity.

35. The apparatus of claim 34, further comprising means for determining the set of ULIDs during the previous P2P session.

36. The apparatus of claim 28, further comprising means for reestablishing a direct connection with the peer mobile device subsequent to the establishing the connection via the WAN backhaul.

37. The apparatus of claim 36, further comprising means for maintaining a session state between the connection via the WAN backhaul and the direct connection.

38. The apparatus of claim 27, further comprising means for maintaining WAN connectivity during the reestablishing the previous session state.

39. The apparatus of claim 28, wherein the means for establishing is further configured to establish the connection without receiving a request from a network entity.

40. A computer program product, comprising:
a non-transitory computer-readable medium comprising code for causing at least one computer to:
cache at least one of a Radio Resource Control (RRC) context and a session management (SM) context for a previous P2P session with a peer mobile device and that has been suspended;
establish a connection with the peer mobile device based at least in part on at least one connection context identifier (CC ID) associated with the previous P2P session, the connection with the peer mobile device using an updated path different from a previous P2P session path; and
reestablish a previous session state based on the at least one of the RRC context and the SM context.

41. The computer program product of claim 40, wherein the updated path includes a wide area network (WAN) backhaul.

42. The computer program product of claim 40, wherein the updated path includes a direct connection.

43. The computer program product of claim 40, wherein the code for causing the at least one computer to reestablish the previous session state is further configured to reestablish the previous session state further based on at least one IP address associated with the previous P2P session.

44. The computer program product of claim 41, wherein the non-transitory computer-readable medium further comprises code for causing the at least one computer to transmit P2P data to the peer mobile device via the WAN backhaul.

45. The computer program product of claim 41, wherein the non-transitory computer-readable medium further comprises code for causing the at least one computer to determine a locator address associated with the previous P2P session.

46. The computer program product of claim 45, wherein the non-transitory computer-readable medium further comprises code for causing the at least one computer to send an update request to remove the locator address associated with the previous P2P session.

47. The computer program product of claim 43, wherein the at least one IP address comprises a set of upper layer identifiers (ULIDs) for WAN connectivity.

48. The computer program product of claim 47, wherein the non-transitory computer-readable medium further comprises code for causing the at least one computer to determine the set of ULIDs during the previous P2P session.

49. The computer program product of claim 41, wherein the non-transitory computer-readable medium further comprises code for causing the at least one computer to reestablish a direct connection with the peer mobile device subsequent to the establishing the connection via the WAN backhaul.

50. The computer program product of claim 49, wherein the non-transitory computer-readable medium further comprises code for causing the at least one computer to maintain a session state between the connection via the WAN backhaul and the direct connection.

51. The computer program product of claim 40, wherein the non-transitory computer-readable medium further comprises code for causing the at least one computer to maintain WAN connectivity during the reestablishing the previous session state.

52. The computer program product of claim 41, wherein the code for causing the at least one computer to establish the connection is further configured to establish the connection without receiving a request from a network entity.

* * * * *